US007170632B1

(12) United States Patent
Kinjo

(10) Patent No.: US 7,170,632 B1
(45) Date of Patent: Jan. 30, 2007

(54) IMAGE REPRODUCING METHOD AND APPARATUS, IMAGE PROCESSING METHOD AND APPARATUS, AND PHOTOGRAPHING SUPPORT SYSTEM

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/315,034

(22) Filed: May 20, 1999

(30) Foreign Application Priority Data

| May 20, 1998 | (JP) | 10-138996 |
| Jun. 10, 1998 | (JP) | 10-161894 |
| Jun. 10, 1998 | (JP) | 10-162130 |
| Sep. 30, 1998 | (JP) | 10-276678 |
| Sep. 30, 1998 | (JP) | 10-277916 |

(51) Int. Cl.
G06K 15/02 (2006.01)
H04N 1/48 (2006.01)
H04N 1/50 (2006.01)
G03B 17/24 (2006.01)

(52) U.S. Cl. .............. 358/1.9; 348/231.3; 348/231.5; 348/231.6; 358/504; 358/527

(58) Field of Classification Search .............. 358/1.9, 358/1.18, 450, 452, 462, 2.1, 3.24, 527, 506, 358/487; 355/39, 46; 348/333.01, 333.02, 348/231.3, 231.5, 231.6
See application file for complete search history.

(56) References Cited

U.S. PATENT DOCUMENTS

| 5,307,108 A | 4/1994 | Yamanouchi et al. |
| 5,467,168 A | 11/1995 | Kinjo et al. |
| 5,666,578 A | 9/1997 | Oikawa et al. |
| 5,689,326 A * | 11/1997 | Yamada et al. ............... 355/39 |
| 5,710,954 A * | 1/1998 | Inoue .................... 348/333.02 |
| 5,966,553 A | 10/1999 | Nishitani et al. |

FOREIGN PATENT DOCUMENTS

| JP | 5426729 | 2/1979 |
| JP | 56153334 | 11/1981 |
| JP | 6380242 | 4/1988 |
| JP | 6380244 | 4/1988 |

(Continued)

Primary Examiner—Scott A. Rogers
(74) Attorney, Agent, or Firm—Birch, Stewart, Kolasch & Birch, LLP

(57) ABSTRACT

The image reproducing method and apparatus capture photographing information in association with the photographed image, obtain supplementary information relating to at least one of the captured photographing information and add the obtained supplementary information to a visible image reproducing the photographing image on a photographic print or a display screen. The image processing method and apparatus determine similarity between respective photographing frame and subject the image data of a plurality of similar frames to similar image processing so that the qualities of the image reproduced from the plurality of the similar frames are made identical. As a result, when user sees the visible image reproduced on the photographic print or the display screen, the user can review the time of photographing. The function of the photographic print or the displayed image is enhanced. Further, the user is provided with the photographic print or the displayed image which is excellent in amusement property in accordance with user's taste and in which the color densities of the similar scenes and the same subjects do not vary.

79 Claims, 13 Drawing Sheets

FOREIGN PATENT DOCUMENTS

| | | |
|---|---|---|
| JP | 63-188644 U | 12/1988 |
| JP | 1-173730 U | 12/1989 |
| JP | 2-149834 A | 6/1990 |
| JP | 3-135535 A | 6/1991 |
| JP | 4-42220 A | 2/1992 |
| JP | 06-027550 A | 2/1994 |
| JP | 6-160996 A | 6/1994 |
| JP | 6160996 A | 6/1994 |
| JP | 7-110532 A | 4/1995 |
| JP | 7-184154 A | 7/1995 |
| JP | 8-88790 A | 4/1996 |
| JP | 08-237467 A | 9/1996 |
| JP | 08-240854 A | 9/1996 |
| JP | 8-240854 A | 9/1996 |
| JP | 08-267821 A | 10/1996 |
| JP | 09-037203 A | 2/1997 |
| JP | 9-61916 A | 3/1997 |
| JP | 2650648 B2 | 5/1997 |
| JP | 09-270987 A | 10/1997 |
| JP | 10-173907 A | 6/1998 |
| JP | 10-239764 A | 9/1998 |

\* cited by examiner

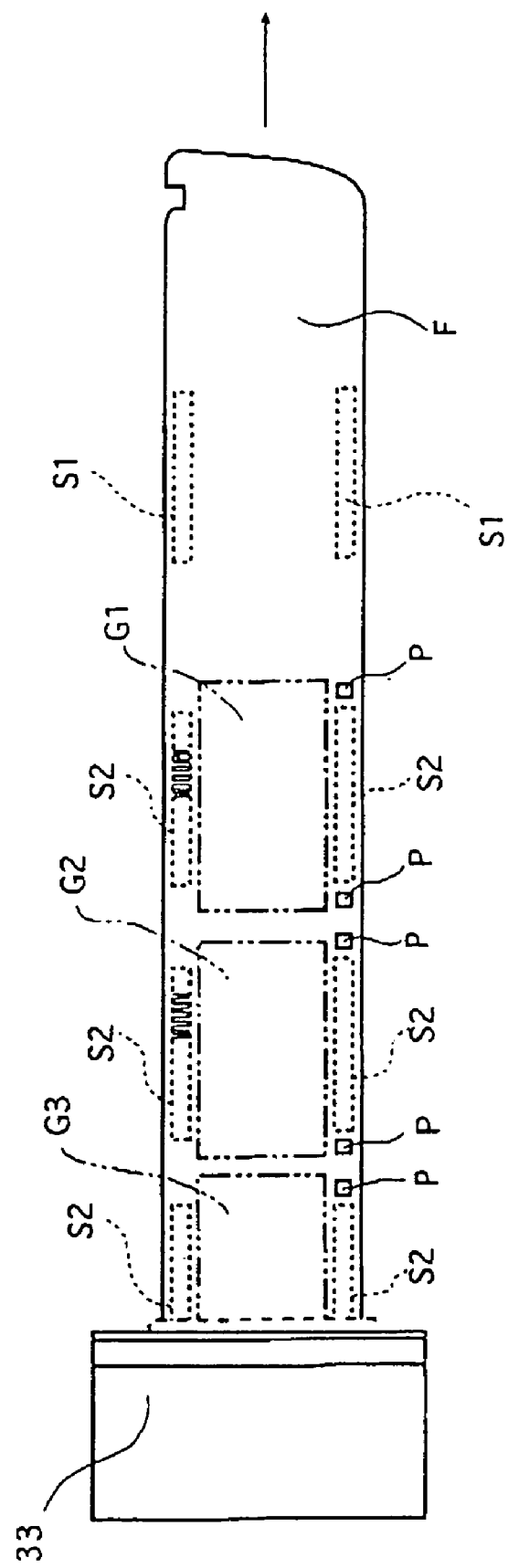

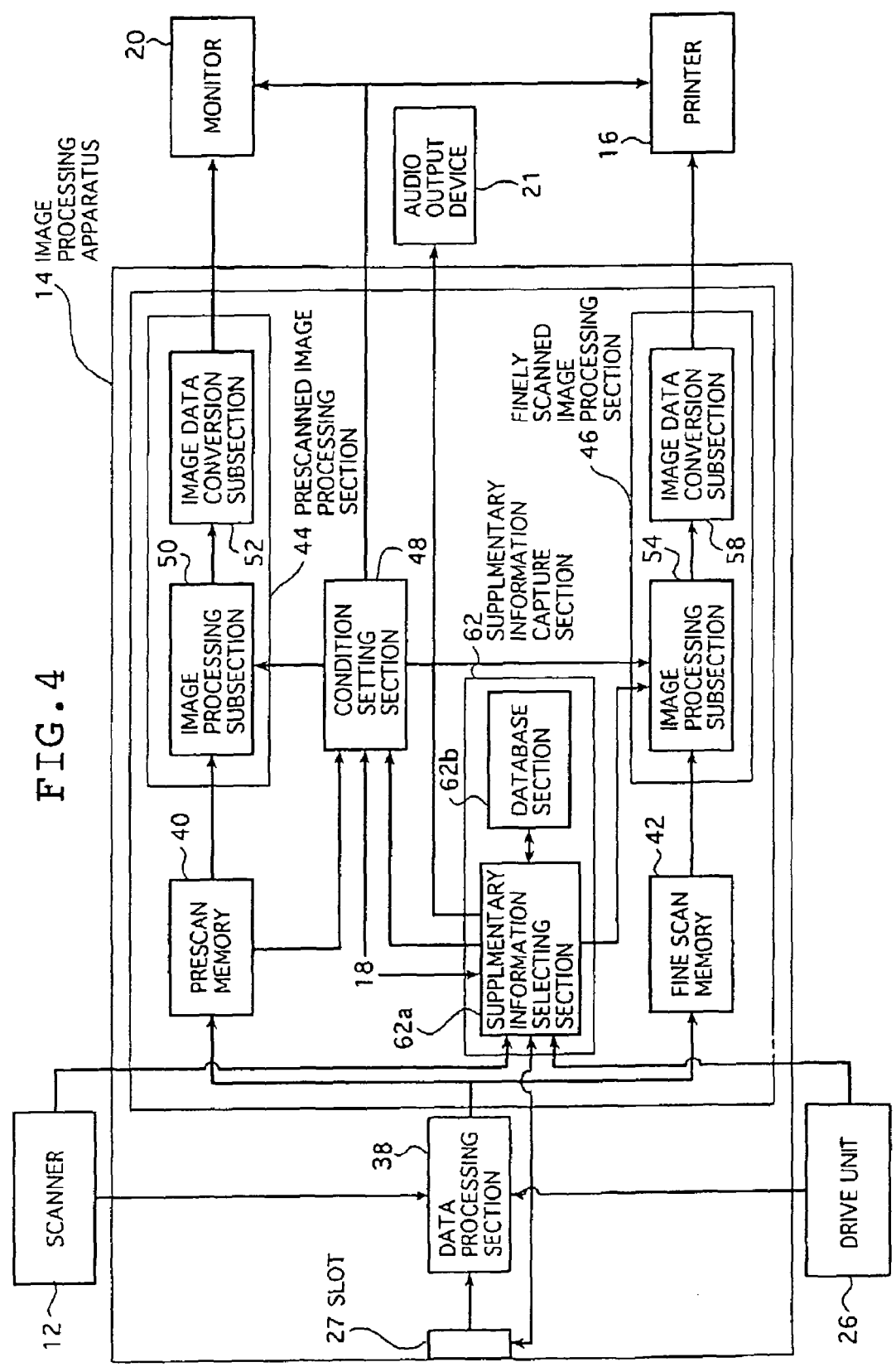

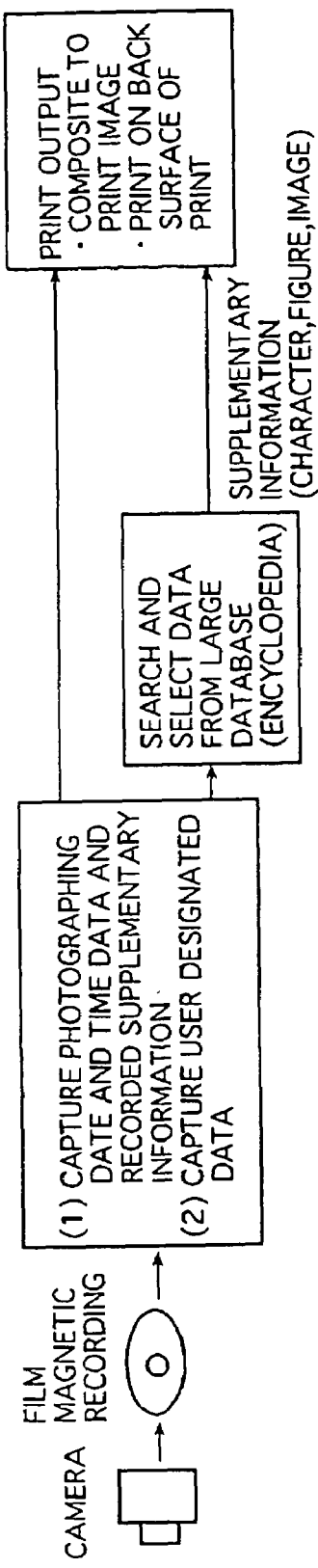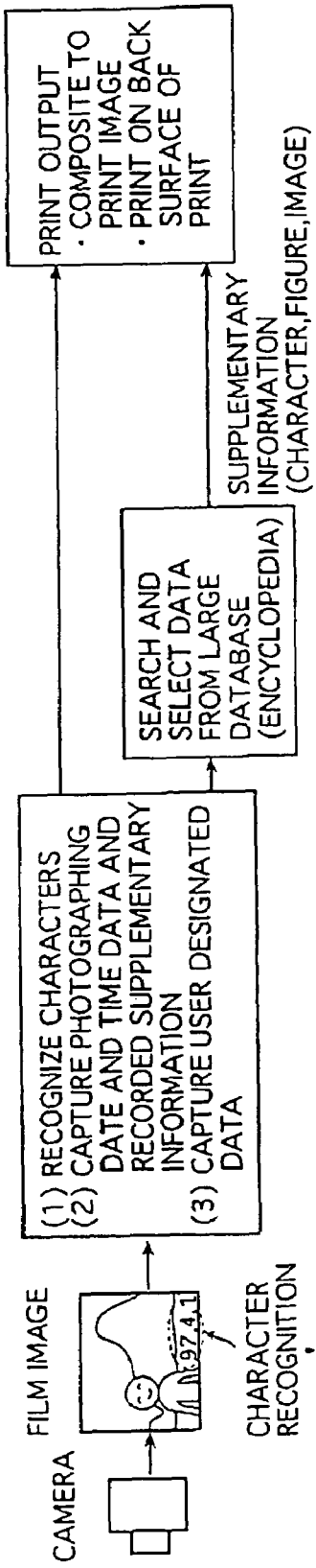

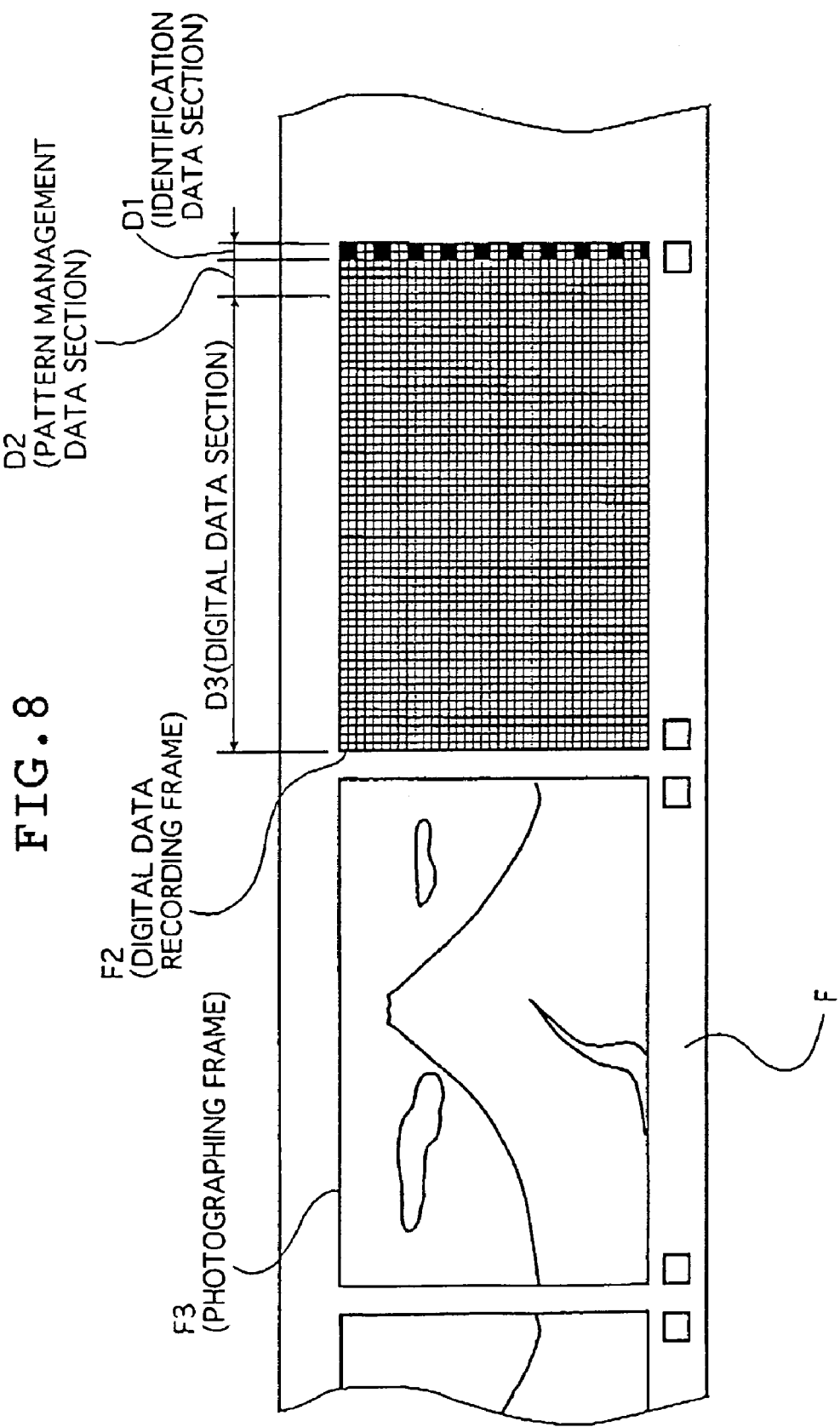

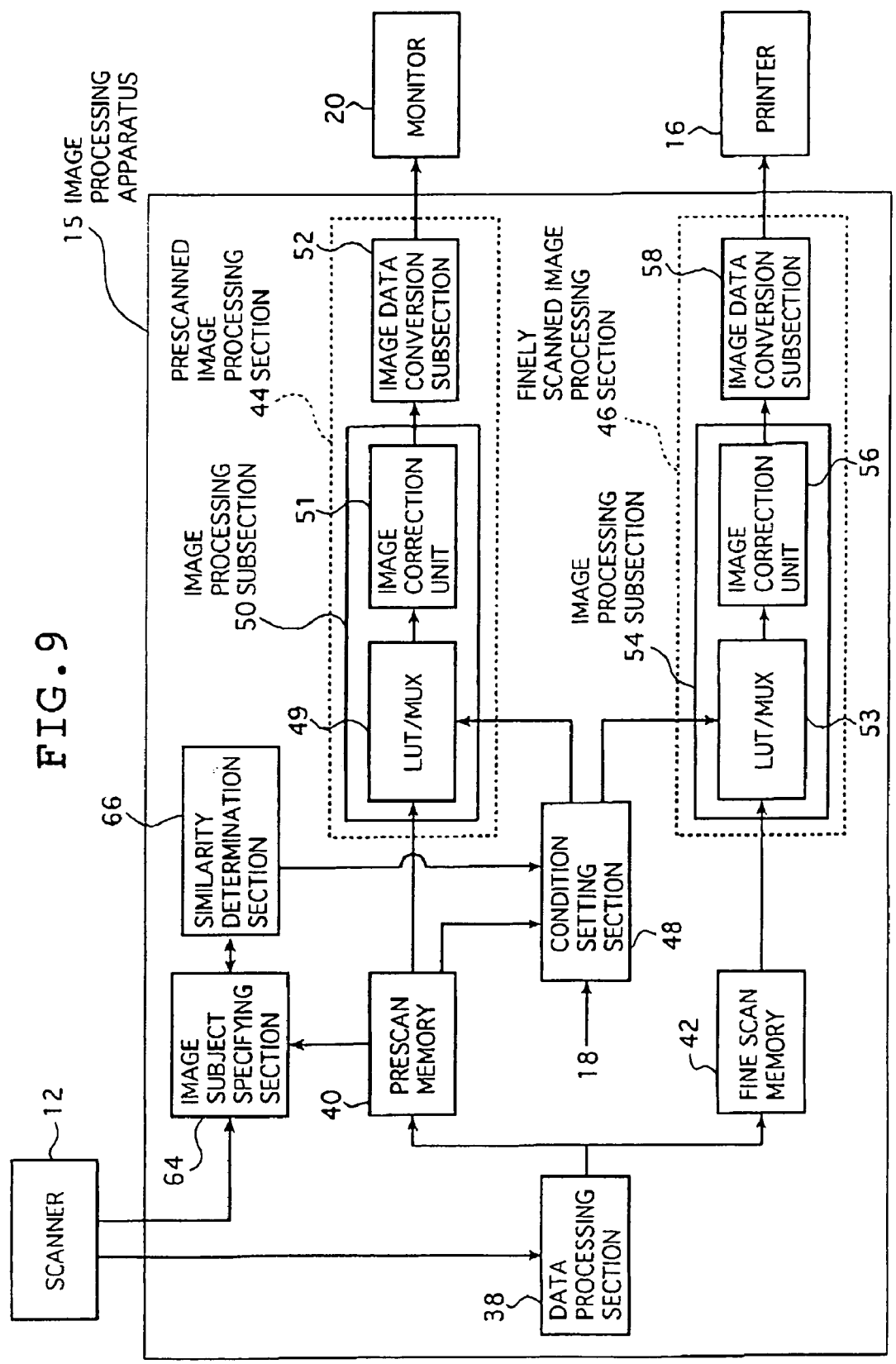

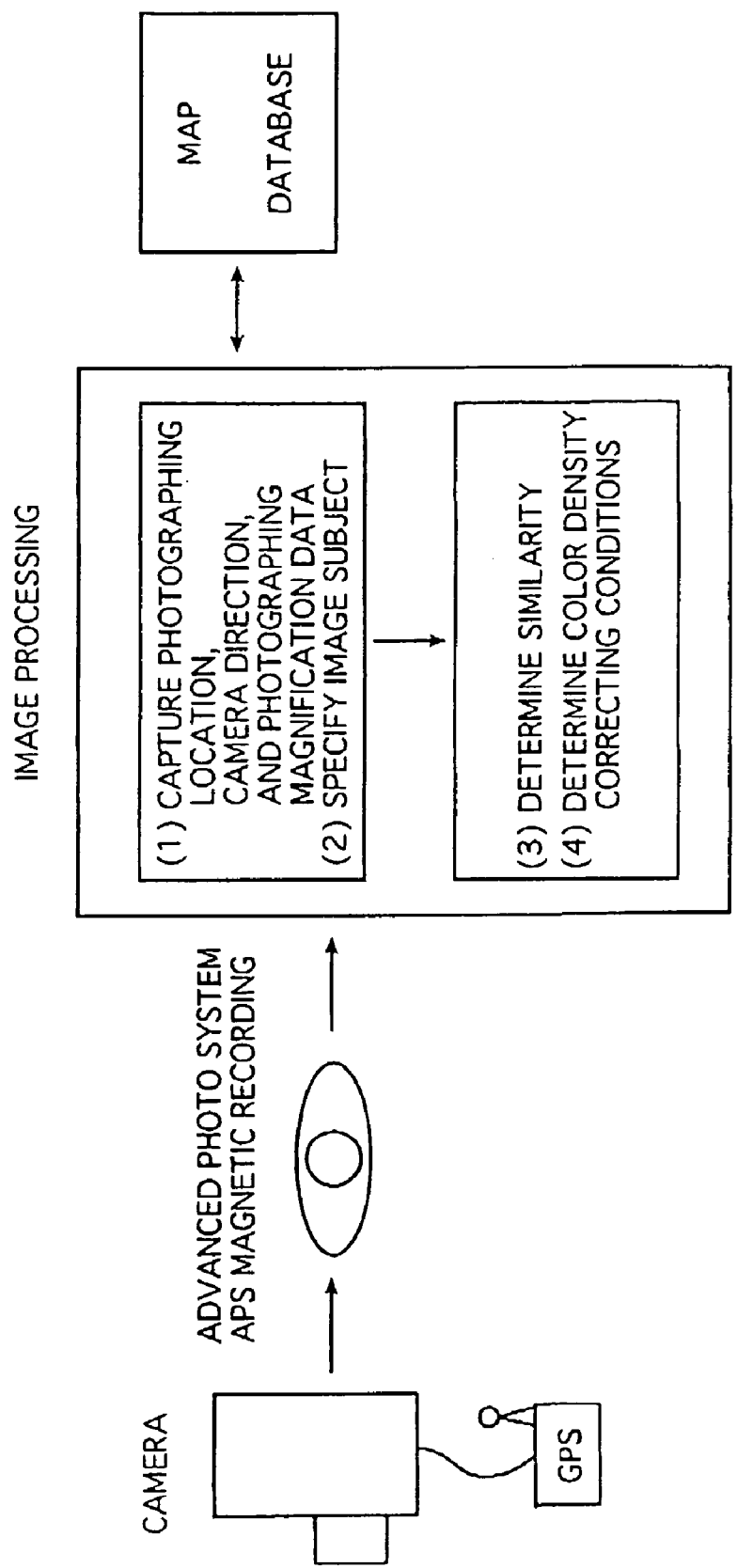

IMAGE REPRODUCING METHOD AND APPARATUS, IMAGE PROCESSING METHOD AND APPARATUS, AND PHOTOGRAPHING SUPPORT SYSTEM

The present invention relates to a image reproducing method and apparatus, an image processing method and apparatus, and a photographing support system. More specifically, the present invention relates to the technical field of image processing which is employed when an image of a subject recorded on a photographic film by a conventional camera is photoelectrically read and digital image data is obtained, or digital image data of the subject recorded by a digital camera is obtained and the thus obtained digital image data is subjected to preset image processing and output to a photographic print or to a display means as a reproduced visible image; to the technical field of photographic print processing which is executed using the digital image data; to the technical field of a print system capable of outputting a print provided with a high added value by making use of the preset region and so forth of a recording medium such as an IC memory, floppy disc and the like; and to the technical filed of a photographing support system capable of outputting a print, on which an image of high quality corresponding to the taste of a customer or to a photographed scene is reproduced, is output as a print, by making use of a camera for photographing an image and, in particular, a recording medium such as an IC memory, floppy disc and the like.

The images recorded on photographic films such as negatives and reversals (which are hereinafter referred to as "films") are conventionally printed onto light-sensitive materials (photographic papers) by a technique generally called "direct exposure" (analog exposure) in which the image on a film is projected onto the light-sensitive material for areal exposure.

In contrast, a printer that adopts digital exposure has recently been commercialized. In this "digital photoprinter", the image in a photographing frame, which was photographed by a conventional camera and recorded on the photographic film, is read photoelectrically and converted into digital image data or digital image data is obtained from the image in a photographing frame which was photographed by a digital camera; the digital image data is subjected to various kinds of image processing to produce recording image data; a light-sensitive material is exposed by scanning with recording light modulated in accordance with the image data, thereby recording an image (latent image) which is then processed photoelectrically to produce a (finished) photographic print.

In digital photoprinters, the image is converted into digital image data and exposing conditions to be used in a printing step can be determined by processing that image data. Hence, by using such digital photoprinters, the correction of dropouts or blocked-ups due to photography with rear light or an electronic flash, sharpening, the correction of color or density failures, the correction of under-or over-exposure, the correction of the insufficiency of marginal light and various other kinds of image processing can be performed effectively enough to produced prints of high quality that have heretofore been impossible to obtain by the direct exposure technique. In addition, a plurality of images can be composited to a single image or one image can be split into segments or even characters can be composited by the processing of image data. If requested, prints can be outputted after requested editing/processing in accordance with a specific application.

The capability of digital photoprinters is by no means limited to outputting the image as a photographic print and they enable the image data to be supplied to computers or stored in image recording mediums such as floppy disks and the like; thus, with digital photoprinters, the image data can be used in various applications other than photography.

Having these features, the digital photoprinter is composed of the following three basic components; a scanner (image reading apparatus) that reads the image recorded on a film photoelectrically; an image processing apparatus that performs image processing of the read image to obtain recorded image data (exposing conditions); and a printer (image recording apparatus) that scan exposes a light-sensitive material in accordance with the recorded (output) image data and performs development and other necessary processes to produce a photographic print.

In the scanner, the reading light emitted from a light source is allowed to be incident on the film, thereby producing projected light that carries the image recorded on the film; the projected light is then passed through an imaging lens to be focused on an image sensor such as a CCD sensor which performs photoelectric conversion to read the image, which is optionally subjected to various kinds of image processing before it is sent to the image processing apparatus as the input image data (image data signals) from the film.

In the image processing apparatus, the image processing conditions are set on the basis of the input image data that has been read with the scanner or read from image recording mediums and supplied to the image processing apparatus, and image processing is applied to the input image data in accordance with the thus set conditions, thereby producing output image data for image recording (i.e., exposing conditions) that are subsequently sent to the printer.

In the printer, if it is an apparatus that adopts exposure by scanning with optical beams, the optical beams are modulated in accordance with the output image data sent from the image processing apparatus, a light sensitive material is two-dimensionally scanned and exposed with the light beams (printed) to thereby form a latent image; then, the exposed light-sensitive material is subjected to preset development processing and other various kinds of processing, whereby a photographic print, on which the image that has been recorded on the film is reproduced, is output as a visible reproduced image.

In addition to the method of obtaining the digital image data by reading recorded images with the scanner, input image data can be obtained from the image data of digital images, which were photographed with, for example, a digital camera and recorded on recording mediums such as floppy discs, MOs, Zips, and the like or from digital image data which were obtained through a network. Image processing conditions are set in accordance with the input image data, which is subjected to image processing in accordance with the thus set image processing conditions. Then, the input image data is sent to the printer as output image data (exposure conditions) for recording the images and can be output as a print on which visible images are reproduced.

As described above, the digital photoprinter has the following features. That is, the images, which were recorded on a film with a conventional type camera, and the digital images, which were recorded with a digital camera and the like, can be simply output as a photographic print; in addition to the above feature, images, which have bad image reproducibility due to improper photographing conditions when they were photographed, are subjected to digital image processing for the correction of a backlighted scene, high contrast scene, underexposed negative film, sharpness, insufficient marginal light, and the like, whereby the images can be easily output as beautiful images of high quality as a photographic print.

In the photographic print service employing the digital processing executed by the currently used digital photoprinter, when a photographing date and time are optically recorded on a film or when an Advanced Photo System APS, in which a photographing date and time are magnetically recorded, is employed, there is available such a service that the photographing date and time are recorded on a finished photographic print. This service is useful to review the situation in which an image was recorded by viewing the printed image, the photographing date and the photographing time. However, there is a case that it is difficult to sufficiently review various situations in which an image was recorded only from the information of the photographing date and the photographing time. That is, when the images of photographic prints are to be seen later, the printed images are reviewed using the photographing date and time as a clue. However, there are many cases in which it cannot be recalled what was photographed for what purpose under what situation. Further, when, for example, a mountain is photographed as a background of an image in which a person is photographed, it may be requested to know the name of the background mountain, the height above sea level of it, and its history.

In such a case, when a photographing location and the supplementary information of it are also available in addition to the supplementary information as to the photographing date and the photographing time, the situation in which the images were photographed can be easily reviewed in many cases.

On the other hand, the recent popularization of personal computers enables digital image processing to be easily carried out by means of the personal computers. Thus, it has become possible to personally composite images which were captured with a scanner or a digital camera and to personally correct images by means of photo retouch software. Accordingly, digital images including photographic prints subjected to digital processing have become excellent in an amusement property because the images can be changed in accordance with a taste by image composite and image correction. However, the photographic print service, which can be presented to photographic prints by the digital processing available at present, includes only the service for displaying the photographing date and time and cannot display supplementary information relating to the photographing date and time and supplementary information in accordance with the contents of photographed images in response to the taste of a user (customer).

From now on, in the presentation of a photographic print service attractive to users, it will be desired to provide supplementary information other than the photographing date and time with photographic prints, thereby enhancing the function of the photographic prints and making the photographic prints excellent in the amusement property.

Incidentally, a print image, which is subjected to digital image processing by the digital photo printer, is an image of high quality when it is observed as a single sheet of image. However, when the images of a multiplicity of similar scenes are recorded on a film, if the images are output as prints which are processed by the conventional image processing method, there arises a problem that the color density of the same image subject is greatly changed depending upon a slight variation of the composition of the image subject regardless of that the image subject is included in the similar scenes. This is because that exposure conditions are determined based on the density of a reproduced image, that is, based on the color density of an image (hereinafter, referred to as color density) and that color balance adjustment and contrast correction are automatically carried out in accordance with the composition. When the images of similar scenes in which a common image subject is included are differently finished, a feeling of wrongness is caused to a user to which a print service is presented and sometimes it is inconvenient to the user. Thus, a problem arises in that there is a possibility that prints must be remade.

To cope with the above problem, according to the proposal of Japanese Unexamined Patent Publication No. 54-26729, Japanese Unexamined Patent Publication No. 56-153334, Japanese Unexamined Patent Publication No. 63-80242 and Japanese Unexamined Patent Publication No. 63-80244, when the mean values, maximum values, minimum values and the like of the color density values of an image at the center and periphery thereof which are obtained from the image are similar to those of an image to be compared therewith, it is determined that there is a highly probability that the images are created from similar photographed scenes and these images are printed under the same or similar conditions. However, when an image subject moves to a peripheral portion of an image and a background image moves to the central portion of the image in the above example, the scenes are not determined similar in the above determination. At the time, since the images are not printed any longer under the same or similar conditions, a problem arises in that the color densities of the image subjects are changed.

Further, in Japanese Unexamined Patent Publication No. 6-160996, it is proposed to determine similar scenes based on photographing information such as a photographing time, luminance value, photographing magnification, distance to image subject, focusing length of image subject, stop value, shutter speed and whether an electronic flash is used or not and to print the similar scenes under the same or similar conditions. However, there are exist the images of similar scenes, that is, the images including a common image subject even if the composition of the common image subject is changed or even if a photographing time, distance to image subject, focusing length of image subject, stop value, and shutter speed are different. For example, landscape images, in which Mt. Fuji having different compositions are photographed from different locations as image subjects, are exemplified.

As described above, since the aforesaid conventional similar scene determination technologies cannot sufficiently determine similar scenes, there is a problem that a print service with which a user can be satisfied cannot be provided because the images of similar scenes cannot be finished to photographic prints of the same quality. Further, there is also a problem that extra prints must be made to finish photographic prints with which the user can be satisfied.

Photographic prints are used to commemorate or record tours and various kinds of events. Further, recently, digital (still) cameras have become widespread.

Photographs taken with conventional cameras are superior to images taken with the digital cameras with respect to the quality of resultant prints. However, the images taken with the digital cameras are advantageous in that images and characters can be composited thereto and color density adjustment, magnification processing and the like can be easily carried out and accordingly prints having an excellent tasteful property and a high added value can be created in accordance with the use of them.

In contrast, there has been commercialized a so-called Advanced Photo System as a system capable of creating photographic prints having a higher added value.

As known well, the Advanced Photo System forms a magnetic recording medium in a film externally of a photographing region thereof and can record, to the magnetic recording medium, photographing information such as, a type of a film, whether or not photographing is performed using an electronic flash, and the like, and various kinds of information, for example, a print format such as a C type, H type and the like, a photographing date and time, a title, and the like.

The use of the magnetic information permits the Advanced Photo System to create photographic prints of higher image quality by subjecting a film to development processing and a print paper (photograph paper) to printing and development processing in accordance with a type of the film and photographing information.

Further, according to the Advanced Photo System, it is possible to change a print format after the completion of photographing, to arbitrarily select the front or back surface of a print and record a photographing date and time of high image quality on it, and to arbitrarily select the front or back surface of the print and to record a title thereon, which were impossible in an ordinary photograph using a 135-sized film and the like, whereby prints of high quality with a high added value can be output.

Recently, however, as the taste of customers is diversified, there is desired the realization of a print system by which prints with a higher added value can be output in both of photographic prints and prints created by digital cameras and the like.

As described above, prints, on which images photographed with cameras using a photographic film, digital cameras and the like are reproduced, are used to commemorate or record tours and various kinds of events.

Customers have a wide variety of tastes to the images reproduced on prints. In addition, the images reproduced on the prints are also affected by the photographing technique of a photographer. Further, preferable images are different depending upon a photographing scene such as a portrait, a landscape, and the like in which the images are recorded.

At present, however, it is very difficult to output prints on which preferable images are reproduced in accordance with the tastes of all the customers (persons requested to create prints) and with various photographing scenes.

Whereas, there have been known cameras which store preferable photographing conditions in accordance with photographing scenes and the like using an IC card or the like and which control a stop, a shutter speed and the like by reading the photographing conditions from the IC card or the like when photographing is carried out.

In this type of the cameras, however, photographing is carried out under fixed conditions provided by camera manufactures and the requests of respective customers cannot be minutely satisfied by the cameras. In addition, since the amount of information which can be recorded to the IC card and the like is limited, it is difficult to set preferable photographing conditions in accordance with a wide variety of photograph scenes.

SUMMARY OF THE INVENTION

A first object of the present invention is to solve the problems of the prior art and to provide a image reproducing method and a image reproducing apparatus capable of; subjecting a digital image data which was photoelectrically read from an image recorded on a film or obtained by being photographed by a digital camera or the like to preset image processing to produce an output image data and, subsequently, when reproduced visible images corresponding to the thus produced output image data are to be outputted as a photographic print or to be displayed on a display means such as a monitor; adding supplementary information accompanying the photographed images such as supplementary information related to the photographing situation of the photographed image and the subject based on a photographing date, time, photographing position or the like to the photographic print or the displayed image in accordance with the user's desire for allowing the user to easily review the time of photographing when the user sees the reproduced visible image, as well as for enhancing function of the photographic print or the displayed image; and providing the user the photographic print or displayed image which is excellent in amusement property in accordance with user's taste.

A second object of the present invention is to solve the above problems of the prior art and to provide an image processing method and an image processing apparatus capable of determining similar scenes and the same image subjects with pinpoint accuracy, and, as a result, capable of removing the dispersion of the color densities of the similar scenes and the same image subjects in a photographic print and capable of reducing the remake printing of a photographic print by making the color densities of the similar scenes and the same photographed objects identical.

A third object of the present invention is to provide an image reproducing method in a print system capable of more enhancing the operability, hobby property, amusement property, use, added value, and the like of photographing (including photographing executed by a photographing device such as a digital camera and the like) by effectively utilizing a recording medium such as an IC memory, a floppy disc and the like as well as capable of creating a print or displayed image which has a higher added value and is excellent in the hobby property and the amusement property.

A fourth object of the present invention is to provide a photographing support system capable of executing photographing under preferable conditions in accordance with the taste of a customer and various photographing scenes by making use of a recording medium such as an IC memory, a floppy disc and the like, thereby capable of stably creating a print on which images are reproduced in accordance with the taste of the customer and a scene.

In order to attain the first object described above, according to the first aspect of the present invention, there is provided an image reproducing method for acquiring digital image data of a photographed image of a subject, obtaining output image data by subjecting the digital image data to preset image processing and outputting a visible image reproducing the photographed image based on the output image data, comprising the steps of:

capturing photographing information in association with the photographed image;

capturing supplementary information relating to at least a part of the captured photographing information; and reproducing and adding the captured supplementary information to the photographed image.

In this aspect, it is preferable that the digital image data is a digital image data obtained by photoelectrically reading the photographed image photographing the subject on a photographic film or a digital image data of the photographed image obtained directly by photographing the subject.

Preferably, the step of outputting the visible image is at least one of the steps of outputting a photographic print and displaying onto display means and the step of display on the display means is at least one of the steps of displaying on a monitor and projecting by a projector.

Preferably, the supplementary information is an information with respect to the subject of the photographed image or a photographing situation of the photographed image.

Preferably, the supplementary information is at least one of character data, document data, audio data, still picture data and motion-picture data.

Preferably, in case of at least one of outputting the visible image on a photographic print and displaying the visible image on a display means, the supplementary information is composited to at least one of the visible image on the photographic print and the displayed visible image on the display means, outputting to a back surface of the photographic print by a back printer, exposed and printed to the back surface thereof, displayed as at least one of characters, documents, still pictures and motion-pictures linking to the visible image displayed on the display means or output in voice linking to the visible image displayed on the display means.

Preferably, at least one of the photographing information and the supplementary information is recorded to a magnetic recording layer of a photographic film which corresponds to a photographing frame of the photographic film to which the photographed image is photographed, recorded optically on the photographic film in accordance with the photographing frame, stored in an IC memory of a photographic film cartridge provided with it in accordance with the photographing frame, recorded into image recording medium on which the digital image data of the photographed image is recorded in accordance with the photographing frame, recorded on a data recording medium in accordance with the photographing frame of the photographic film or the digital image data, recorded in a database in accordance with the photographing frame of the photographic film or the digital image data, and/or recorded on a designated recording ware via networks in accordance with the photographing frame of the photographic film or the digital image data, said at least one of the photographing information or the supplementary information is read out from at least one of the magnetic recording layer, the recording optically on the photographic film, the IC memory, the image recording medium, the data recording medium, the database and the designated recording ware when the image of said photographing frame is reproduced as the visible image, and the supplementary information captured from the read-out photographing information or the read-out supplementary information is output by being added to a photographed image of said photographing frame.

Preferably, in case of outputting at least one of the visible image on a photographic print and a display screen on the display means, at least one of the photographing information and the supplementary information is optically exposed and printed to a photographing frame of the photographic film to which the image is photographed before the photographic film is developed, when the image of the photographing frame is simultaneously printed or reprinted after the photographic film is developed, the photographing information or the supplementary information, which is optically exposed and printed, is read from the image frame of the photographing frame of the photographic film to which the photographing information or the supplementary information is printed, and supplementary information captured from the read photographing information is reproduced by being added to the photographic print or the display screen, or the read supplementary information is reproduced, as it is or after it is processed, by being added to the photographic print or the display screen.

It is also preferable that the photographing information is at least a part of a photographing date and time data which is captured in association with the photographed image.

Preferably, the photographing date and time data is data representing at least one of the photographing date and the photographing time of the photographed image or a part of them, and the supplementary information is relating supplementary information which is searched and selected from the supplementary information stored in a database beforehand using at least one of the year, month, date and time of the photographing date and time data as a searching basis.

Preferably, the supplementary information is searched and selected based on user designated data in addition to the photographing date and time data.

Preferably, the photographing information is at least one of a first data composition containing a photographing location, a second data composition containing the photographing location and a photographing direction, a third data composition containing the photographing location and a photographing magnification and a fourth data composition containing the photographing location, the photographing direction and the photographing magnification, which are captured in association with the photographed image in addition to the photographing date and time data.

It is further preferable that the photographing information is at least one of a first data composition containing a photographing location, a second data composition containing the photographing location and a photographing direction, a third data composition containing the photographing location and a photographing magnification and a fourth data composition containing the photographing location, the photographing direction and the photographing magnification, which are captured in association with the photographed image.

Preferably, the photographing information includes an information of the photographing location which is captured by a position measuring device using a satellite.

Preferably, the supplementary information is an information as to the photographed subject, a photographic point or both, which is specified based on the photographing information of at least one of the first, the second, the third and the fourth data compositions or based on at least one of this photographing information and a map information from the supplementary information stored in a database beforehand.

Preferably, said at least one of the photographed subject and the photographic point is specified by a pattern matching between the photographed image and a three-dimensional image, which is created based on the photographing information of said at least one of the first, the second, the third and the fourth data compositions and based on the map information.

Preferably, the supplementary information is at least one of character data, document data, audio data, still picture data and motion-picture data as to the photographed subject.

Preferably, in case of at least one of outputting the visible image on a photographic print and displaying the visible image on a display means, the supplementary information is added to at least one of the photographic print and a displayed image on the display means by compositing a three-dimensional computer graphic image to the photographed image or by compositing an image arranged as a database to the photographed image and by outputting the photographic print and/or by displaying on the display means, wherein the three-dimensional computer graphic image is created based on said photographing information and on a map information and whose pattern is matched with the subject of the photographed image, and the image arranged as the database is selected from a plurality of images, which are photographed beforehand and arranged as a database, as an image, whose photographing location and photographing direction are nearest to the photographing location and the photographing direction, and is corrected in accordance with the composition of the photographed image and the size of the subject.

According to the first aspect of the present invention, there is provided an image reproducing apparatus including image input means for acquiring digital image data of a photographed image of a subject, image processing means for obtaining output image data by subjecting the digital image data obtained by the image input means to preset image processing, and image output means for outputting a photographed image as a visible image based on the output image data which is output from the image processing means, comprising:

photographing information capture means for capturing photographing information in association with the photographed image;

supplementary information capture means for capturing supplementary information relating to at least a part of the photographing information captured by said photographing information capture means; and supplementary information output means for adding the supplementary information captured by said supplementary information capture means to the photographed image reproduced as the visible image.

In this aspect, it is preferable that the image input means reads photoelectrically the digital image data from the photographed image photographing the subject on a photographic film or obtains directly a digital image data of the photographed image by photographing the subject.

Preferably, the image output means is at least one of image recording means for outputting a photographic print in which the visible image is reproduced and display means for reproducing and displaying the visible image and the display means is at least one of a monitor for displaying the visible image and a projector for projecting the visible image.

Preferably, the supplementary information is an information with respect to the subject of the photographed image or a photographing situation of the photographed image.

It is also preferable that the photographing information capture means captures at least a part of photographing date and time data in association with the photographed image as the photographing information.

Preferably, the photographing information capture means captures at least a part of the photographing date and photographing time of the image as the photographing date and time data, and said supplementary information capture means comprises a database in which the supplementary information is stored and supplementary information selection means for searching the database using at least a part of the photographing date and time data and for selecting the supplementary information relating to at least a part of the photographing date and time data from the supplementary information stored in the database beforehand.

Preferably, the supplementary information selection means searches the database and selects the supplementary information based on user designated data in addition to at least a part of the photographing date and time data.

Preferably, the photographing information capture means further captures at least one of a first data composition containing a photographing location, a second data composition containing the photographing location and a photographing direction, a third data composition containing the photographing location and a photographing magnification and a fourth data composition containing the photographing location, the photographing direction and the photographing magnification, which are captured in association with the photographed image in addition to the photographing date and time data.

It is further preferable that the photographing information capture means captures at least one of a first data composition containing a photographing location, a second data composition containing the photographing location and a photographing direction, a third data composition containing the photographing location and a photographing magnification and a fourth data composition containing the photographing location, the photographing direction and the photographing magnification, which are captured in association with the photographed image.

Preferably, the photographing information capture means captures the photographing information including the information of the photographing location which is captured by a position measuring device using a satellite.

Preferably, the supplementary information capture means comprises a database for storing the supplementary information as to at least one of the subject and a photographic point, and supplementary information selection means selects and captures the supplementary information as to at least one of the photographed subject and the photographic point, which is specified based on the photographing information of one of the first data composition to the fourth data composition or based on this photographing information and a map information.

It is still further preferable that the image output means is at least one of image recording means for outputting a photographic print in which the subject is reproduced and display means for reproducing and displaying the visible image, and wherein said supplementary information output means is at least one of image composite means for extending the supplementary information to digital image information and for compositing the digital image information to the digital image data which is subjected to image processing by said image processing means, outputting means for outputting the supplementary information to the back surface of the photographic print through a back printer, exposing and printing means for exposing and printing the supplementary information to the back surface of the photographic print, linking means for linking the supplemental information to the visible image on the display means to display the supplemental information as at least one of characters, documents, still pictures and motion-pictures on the display means and audio outputting means for outputting the supplemental information in voice to link it to the visible image on the display means.

In order to attain the second object described above, according to the second aspect of the present invention, there is provided an image processing method for obtaining the image data of a photographing frame which is photographed with a camera and for obtaining output image data to be output as a visible reproduced image by subjecting the image data to preset image processing, comprising the steps of:

reading photographing information in association with the image of the photographing frame;

determining similarity between respective photographing frames based on the read photographing information; and subjecting the image data of a plurality of similar frames which are determined to have similarity to similar image processing so that the qualities of the images reproduced from a plurality of the similar frames are made identical.

In this aspect, it is preferable that the photographing information is at least one of a photographing location associated with the image of the photographing frame and the photographing direction of the camera.

Preferably, the photographing information further includes at least one of a photographing magnification and a photographing date and time associated with the image of the photographing frame.

Preferably, the photographing location is information which is captured by a position measuring device using a satellite.

It is further preferable that the similarity is determined by specifying photographed image subjects using the read photographing information and by determining whether common specified image subjects exist or not.

It is also preferable that the similarity is determined by determining a degree of similarity between photographing frames as to the read photographing information and by comparing the determined degree of similarity with a preset threshold value.

Preferably, the degree of similarity between the photographing frames is represented by the weighed mean value of the absolute values of the differences determined between the respective ones of the read photographing information or by the weighed mean value of the squares of the respective differences.

It is still further preferable that the similar image processing is processing for determining the exposure of all the frames for a plurality of the similar frames, determining the mean value or the weighted mean value of the determined exposure of the respective similar frames and setting the exposure of each similar frame to the mean value or to the weighed mean value so that the images reproduced from a plurality of the similar frames are made identical.

Preferably, the similar image processing includes processing for making the exposures of the specified image subjects identical so that the densities of the reproduced images of the respective specified image subjects, which are determined similar by the determination of the similarity of them, of a plurality of the photographing frames are made identical.

According to the second aspect of the present invention, there is provided an image processing apparatus for obtaining the image data of a photographing frame which is photographed with a camera and for obtaining output image data to be output as visible reproduced image by subjecting the image data to preset image processing, comprising:

photographing information capture means for capturing at least one photographing information of a photographing location and camera direction in association with the image of the photographing frame;

a similarity determination means for determining similarity between a plurality of photographing frames based on the photographing information captured by said photographing information capture means; and an image processing means for subjecting the image data of a plurality of the similar frames which are determined to have similarity by said similarity determination means so that the qualities of the images reproduced from a plurality of the similar frames are made identical.

In order to attain the third object described above, according to the third aspect of the present invention, there is provided an image reproducing method, comprising the steps of:

recording supplementary information to a supplementary information recording region using a recording medium having a photographing image recording region and the supplementary information recording region;

photographing a subject with a camera on which the recording medium is mounted to record an image to the photographing image recording region of the recording medium; and automatically or selectively recording the supplementary information recorded to the supplementary information recording region to at least one of the front surface and back surface of a photographic print, a displayed image output on display means or both when the image recorded to the photographing image recording region is output.

In this aspect, it is preferable that the image reproducing method further comprises the step of reproducing the supplementary information recorded to the supplementary information recording region of the recording medium with the camera on which the recording medium is mounted.

According to this aspect, there is provided a camera on which a recording medium having a photographing image recording region and a supplementary information recording region is mounted, wherein supplementary information is recorded to the supplementary information recording region and wherein the recorded supplementary information is reproduced from the supplementary information recording region.

According to this aspect, there is provided an image reproducing apparatus for outputting an image recorded to a photographing image recording region of a recording medium having the photographing image recording region and a supplementary information recording region, wherein supplementary information is recorded to the supplementary information recording region of the recording medium and wherein the supplementary information recorded to the supplementary information recording region is recorded automatically or selectively to at least one of the front surface and back surface of a photographic print, a displayed image output on display means or both.

Preferably, the image is recorded to the photographing image recording region of the recording medium by photographing a subject with a camera on which the recording medium is mounted.

Preferably, the supplementary information recorded to the supplementary information recording region of the recording medium is reproduced with the camera on which the recording medium is mounted.

According to this aspect, there is provided an image reproducing method, comprising the steps of:

recording supplementary information to a supplementary information recording region using a recording medium having a photographing image recording region and the supplementary information recording region; and automatically or selectively recording the supplementary information recorded to the supplementary information recording region to at least one of the front surface and back surface of a photographic print, a displayed image output on display means or both when the image recorded to the photographing image recording region of the recording medium is output.

According to this aspect, there is provided an image photographing method, comprising the steps of:

recording supplementary information to a supplementary information recording region using a recording medium having a photographing image recording region and the supplementary information recording region; and reproducing the supplementary information with a camera on which the recording medium is mounted.

Preferably, the recording medium is a film cartridge comprising a case in which a photographic film as a photographing image recording region is accommodated and on which an IC memory as the supplementary information recording region is mounted, or the recording medium is a memory medium which has a photographed image data region and a supplementary information region as well as includes information added thereto with the camera and/or a supplementary information recording means to recognize the address of each region or fixedly includes information for recognizing the address of each region.

It is also preferable that the supplementary information is at least one of information as to a photographing location, information as to a photographing subject and amusement information.

It is further preferable that the supplementary information is recorded to the supplementary information recording region by at least one of the recording operation executed by a print shop before photographing is carried out and the recording operation executed by the camera on which the recording medium is mounted.

In order to attain the fourth object described above, according to the fourth aspect of the present invention, there is provided a photographing support system, comprising the steps of:

using a recording medium having a photographing image recording region and an information recording region;

recording photographing support information to the information recording region before an image is photographed to the photographing image recording region;

reading the photographing support information from the information recording region with an information reading means mounted on a camera in photographing; and executing at least one of the control of the photographing operation carried out by the camera and the reproduction of the photographing support information in accordance with the read photographing support information.

In this aspect, it is preferable that the recording medium is a film cartridge comprising a case in which a photographic film as a photographing image recording region is accommodated and on which an IC memory as an information recording region is mounted, or the recording medium is a memory medium which has a photographed image data region and an information recording region as well as includes information added thereto by the camera and/or an information recording means to recognize the address of each region or fixedly includes information for recognizing the address of each region.

It is also preferable that the photographing support information is photographing information accumulated corresponding to each customer as well as information as to the photographing conditions of the camera which are set in accordance with at least one of photograph image correcting information and classified photographing scenes.

According to the present invention, there is provided an image reproducing method for obtaining the digital image data of the image of a photographing frame, to which an image subject is photographed, of an image recording medium, obtaining output image data by subjecting the obtained digital image data to preset image processing and outputting at least one of a photographic print and a displayed image based on the output image data, comprising the steps of:

capturing photographing information in association with the image of the photographing frame;

capturing supplementary information relating to at least a part of the captured photographing information; and adding the captured supplementary information to at least one of the photographic print and the displayed image.

It is preferable that the image recording medium is a photographic film, and the digital image data is obtained by photoelectrically reading the image of a photographing frame photographed to the photograph film.

It is also preferable that the image recording medium is a digital recording medium, and the digital image data is directly recorded to the digital data recording medium by being photographed with a digital photographing device and then read from the digital data recording medium.

It is further preferable that the image reproducing method further comprises the steps of:

determining the similarity between respective photographing frames based on the photographing information; and subjecting the image data of a plurality of similar frames which are determined to have similarity to similar image processing so that the qualities of the images reproduced from a plurality of the similar frames are made identical.

It is still further preferable that an image recording medium having a photographing image recording region and a supplementary information recording region is further used as the image recording medium, and when supplementary information is recorded to the supplementary information recording region, the supplementary information is reproduced with a camera on which the image recording medium is mounted and the image recorded to the photographing image recording region is output, the supplementary information recorded to the supplementary information recording region is automatically or selectively recorded to at least one of the front surface and the back surface of a photographic print, a displayed image output on display means or both.

It is yet further preferable that an image recording medium having a photographing image recording region and a supplementary information recording region is further used as the image recording medium, and a photographing support method is executed when an image subject is photographed, the photographing support method comprising the steps of:

recording photographing support information to the supplementary information recording region before an image is photographed to the photographed image recording region;

reading the photographing support information from the supplementary information recording region with information reading means mounted on a camera in photographing; and executing at least one of the control of the photographing operation carried out by the camera and the reproduction of the photographing support information in accordance with the read photographing support information.

According to the present invention, there is provided an image reproducing apparatus including image input means for obtaining the digital image data of the image of a photographing frame, to which an image subject is photographed, of an image recording medium, image processing means for obtaining output image data by subjecting the digital image data obtained by the image input means to preset image processing, and image outputting means for outputting at least one of a photographic print and a displayed image based on the output image data which is output from the image processing means, comprising:

photographing information capture means for capturing photographing information in association with the image of the photographing frame;

supplementary information capture means for capturing supplementary information relating to at least a part of the photographing information captured by said photographing information capture means; and supplementary information output means for adding the supplementary information captured by said supplementary information capture means to at least one of the photographic print and the displayed image.

It is preferable that the image recording medium is a photograph film, and said image input means obtains the digital image data by photoelectrically reading the image of the frame photographed to the photograph film.

It is also preferable that the image recording medium is a digital recording medium, and said image input means obtains the digital image data, which is directly recorded to the digital data recording medium by being photographed with a digital photographing device, by reading it from the digital data recording medium.

It is further preferable that the image reproducing apparatus further comprises similarity determination means for determining the similarity between a plurality of the photographing frames based on the photographing information captured by said photographing information capture means, wherein said image processing means subjects the digital image data of a plurality of the similar frames which are determined to have similarity by said similarity determination means to similar image processing so that the qualities of the images reproduced from a plurality of the similar frames are made identical.

BRIEF DESCRIPTION OF THE DRAWINGS

FIG. 3 is a plan view of a film of an Advanced Photo System to be set to the scanner of the image reproducing apparatus shown in FIG. 1;

FIG. 4 is a block diagram of an embodiment of an image processing apparatus of the image reproducing apparatus shown in FIG. 1;

FIG. 5A and FIG. 5B are flowcharts showing examples of the flow of the image reproducing method of the present invention, respectively;

FIG. 8 is a schematic view showing an example of a negative film to which digital data is printed by the image reproducing method of the present invention;

FIG. 9 is a block diagram showing an embodiment of an image processing apparatus for embodying the image processing method of the present invention;

FIG. 10 is a flowchart showing an example of the flow of the image processing method of the present invention;

DETAILED DESCRIPTION OF THE INVENTION

An image reproducing method and an image reproducing apparatus, an image processing method and apparatus, and a photographing support system according to the present invention will be described below in detail based on the preferable embodiments shown in the accompanying drawings.

First, the image reproducing method and apparatus as a first aspect of the present invention will be described with reference to FIG. 1 to FIG. 8.

Figure 1:
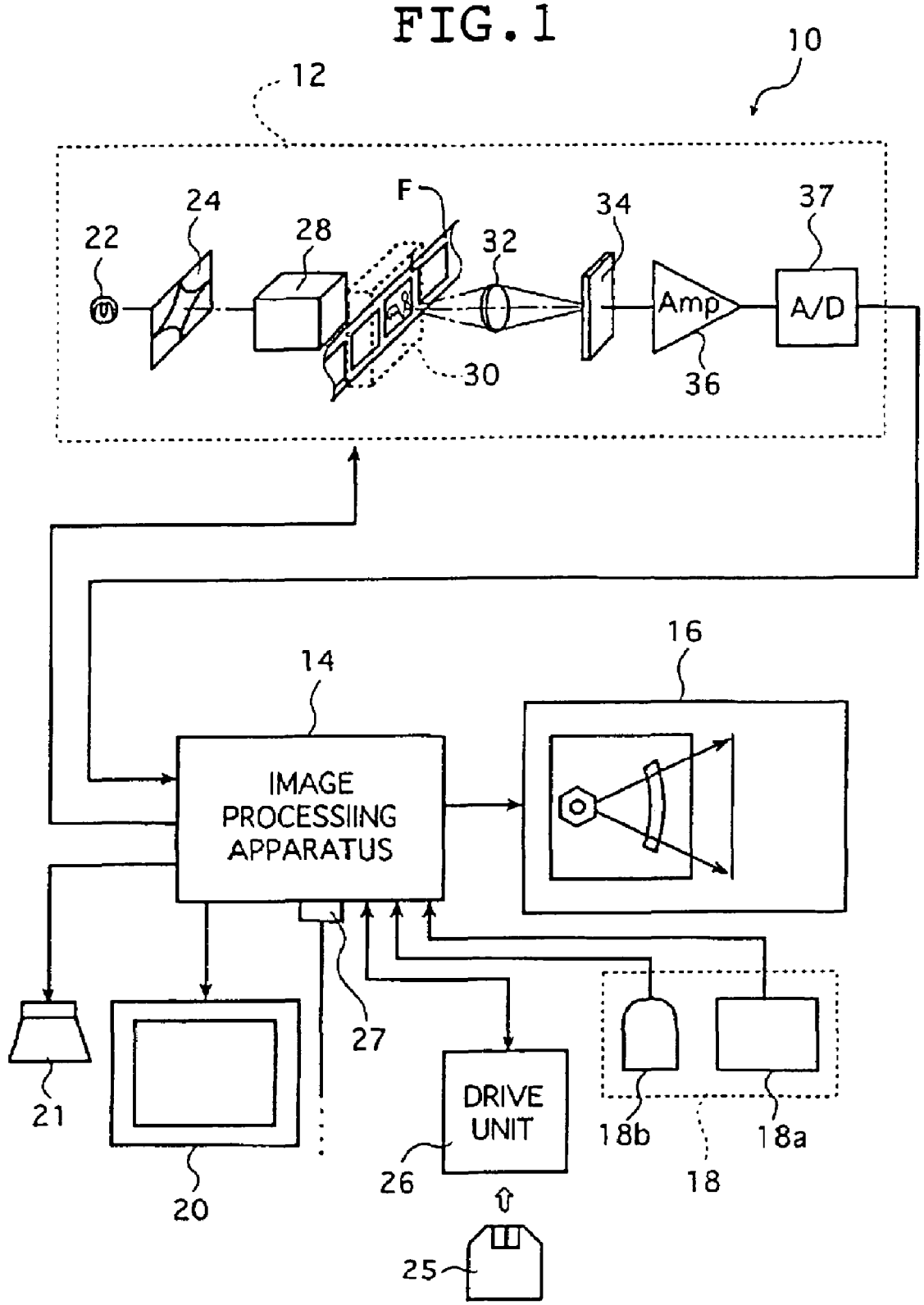
FIG. 1 is a block diagram of an embodiment of a image reproducing apparatus for embodying a image reproducing method of the present invention.

FIG. 1 shows a block diagram of a digital photoprinter for embodying the image reproducing method of the present invention, the digital photoprinter being also an embodiment of a image reproducing apparatus of the present invention.

The digital photoprinter 10 shown in the figure basically comprises: a scanner 12 (image reading device) that reads the image recorded on a film F photoelectrically; an image processing apparatus 14 that performs image processing of the thus read image data (image information), as well as various data processing for performing the image reproducing method of the invention, and that allows for manipulation, control and the like of the digital photoprinter 10 in its entirety; and a printer 16 that exposes a light-sensitive material imagewise with optical beams modulated in accordance with the image data outputted from the image processing apparatus 14, develops the light-sensitive material and outputs it as a photographic print.

The image processing apparatus 14 includes a manipulating unit 18 having a keyboard 18*a* and a mouse 18*b* to enter and set various conditions, to select a specific processing step and issue a command for the step and to enter commands for color/density correction and the like, as well as an image display device (monitor) 20 that displays the image read with the scanner 12, various kinds of manipulative instructions, and screens on which various conditions are set and/or registered.

The scanner 12 is a device for reading the image recorded on the film F photoelectrically. The scanner 12 comprises a light source 22, a variable stop 24, a diffuser box 28 with which the reading light incident on the film F is made uniform on the plane of the film F, an imaging lens unit 32, a CCD sensor 34 which is a photo sensor that reads the image recorded on the film, an amplifier 36 and an A/D (analog/digital) converter 37. Further, the scanner 12 comprises a dedicated carrier 30 which can be mounted on and dismounted from the main body of the scanner 12.

Figure 2A:
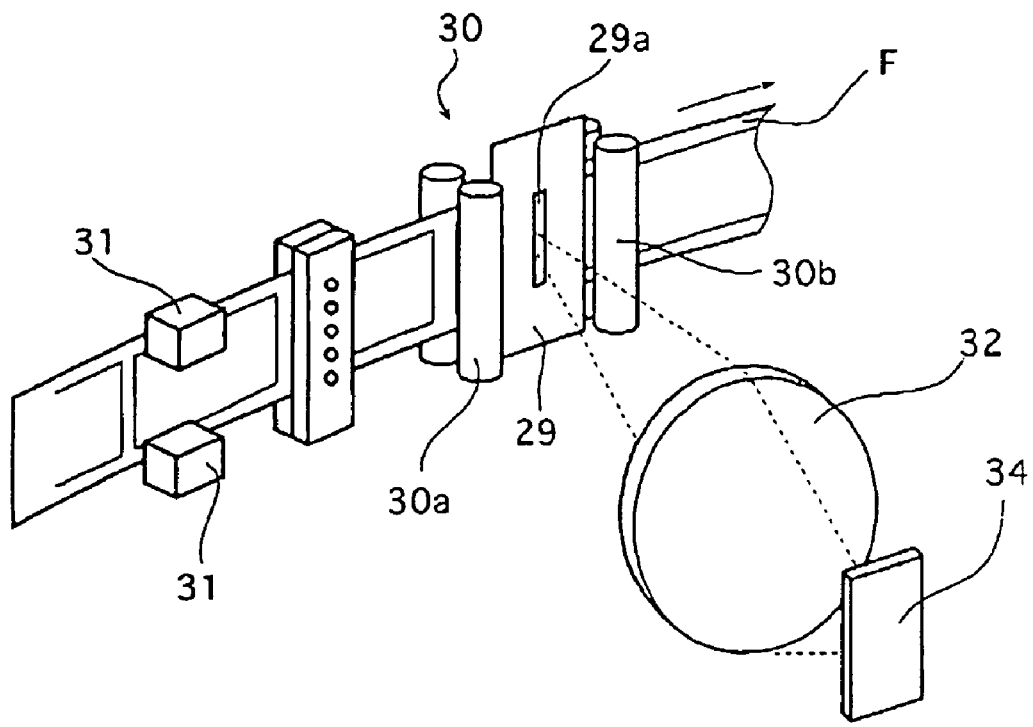
FIG. 2A is a perspective view schematically showing the main portion of a scanner of the image reproducing apparatus shown in FIG. 1.

As the carrier 30, there are prepared various types of dedicated carriers which correspond to elongated films such as, for example, a 24-exposures film of 135 size, a film for the Advanced Photo System (APS cartridge), and the like. As shown in FIG. 2A, the carrier 30 includes transport rollers pairs 30a and 30b, a mask 29 having a slit 29a and magnetic reading and writing units 31. The transport rollers 30a and 30b are disposed on the opposite sides of a preset reading position in an auxiliary scanning direction which is perpendicular to the main scanning direction. They transport the film F with its length being parallel to the auxiliary scanning direction which is perpendicular to a direction in which the line CCD sensor of the CCD sensor 34 extends (main scanning direction) while holding the film F at the preset reading position. The slit 29a defines the light projected from the film F so that the light has a preset slit shape, is located in registry with the reading position and extends in the main scanning direction.

Being held by the carrier 30, the film F is illuminated with the reading light while transported in the auxiliary scanning direction. Consequently, the film F is subjected to two-dimensional slit scan with the reading light passing through the slit 29a extending in the main scanning direction, whereupon the image of each frame recorded on the film F is captured.

Figure 2B:
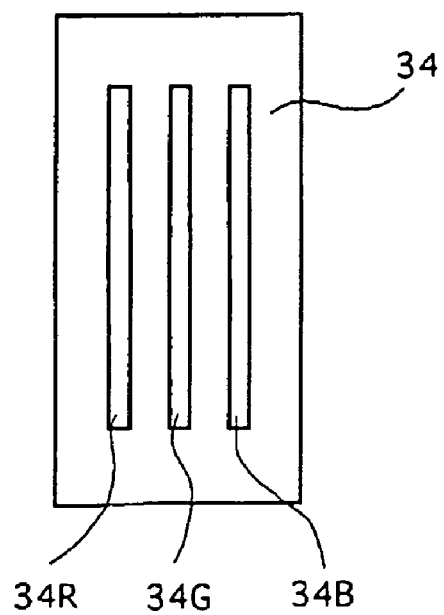
FIG. 2B is a conceptual view of an image sensor used in the scanner shown in FIG. 2A.

As shown in FIG. 2B, the CCD sensor 34 is a line sensor comprising a line CCD sensor 34R for reading R image, a line CCD sensor 34G for reading G image, and a line CCD sensor 34B for reading B image. These line sensors extends in the main scanning direction. The light projected from the film F is separated into three primary colors R, G and B and captured photoelectrically by means of the CCD sensor.

The reading light emitted from the light source 22 is adjusted in quantity by passage through the variable top 24, then uniformly diffused in the diffuser box 28; the thus treated reading light is incident on the film F which is transported while being held at the preset reading position by the carrier 30, through which it is transmitted to produce projected light that carries the image recorded on the film F.

The light projected from the film F passes through the imaging lens unit 32 to be focused on the light-receiving plane of the CCD sensor 34 and read with the CCD sensor 34 photoelectrically; the resulting output signal is amplified with the amplifier 36, converted into digital image data with the A/D converter 37 and, thereafter, sent to the image processing apparatus 14 as an input image data.

As known well, in the film F of the Advanced Photo System APS shown in FIG. 3, magnetic recording layers are formed to the portions S2 above and below the image recording regions G1, G2 and the like of the respect frames of the film F, to which photographed images are recorded, on the back surface (non-emulsifier surface) of the film F. Recorded to the magnetic recording layers are a cartridge ID, film type, etc., the data of photographing information, for example, a photographing date and time such as a photographing date, photographing time and so forth, photographing location, photographing direction, photographing magnification and the like, supplementary information based on the photographing information, and further supplementary information related to at least a part of photographing information such as above all, supplementary information related to the subject itself or the photographing situation of the photographed image, which is defined by these photographing information, and supplementary information added when a photo print order was placed before. The thus recorded information is captured with the magnetic reading and writing units 31 when an image of the film F is read with the scanner 12. More specifically, while the film (cartridge) F of the Advanced Photo System APS is set to the carrier 30 corresponding to the film and the film F is transported in the auxiliary scanning direction and read with the CCD sensor 34, the magnetically recorded information is read with the magnetic reading and writing units 31 shown in FIG. 2A. Then, various kinds of information including the photographing information is sent to the image processing apparatus 14. When required, necessary information such as the supplementary information and the like based on the photographing information is recorded to the magnetic recording layers by the magnetic reading and writing units 31.

Further, when the film cartridge 33 includes an IC memory mounted thereon and if a cartridge ID, film type, and the data of photographing information such as photographing date and time, photographing location, photographing (camera) direction, photographing magnification and so forth are recorded to the thus mounted IC memory, the information can be read. In addition, when the supplementary information which was added when the photo print order was placed before is recorded, the supplementary information is also read. Furthermore, necessary information is recorded to the IC memory when necessary.

It is needless to say that the method of capturing and the method of recording photographing information and supplementary information, which is based on the photographing information, are not limited to the reading of data from and the recording of data to the magnetic recording layers of the APS film and the IC memory of the film cartridge provided with it. Methods of capturing and recording the photographing information and supplementary information other than the above will be described later, respectively.

It should be noted that the scanner 12 which constitutes the digital photoprinter 10 is by no means limited to a type that relies upon the slit scan capturing described above but that it may be a CCD area sensor making use of areal exposure by which the entire surface of the image in one frame is captured at a time. In this alternative approach, R, G and B color filters are interposed between the variable top 24 and the diffuser box 28 shown in FIG. 1. In this case, the projected light which carries the image recorded to the frame of the film F may be obtained in such a manner that the light having passed through the color filters and subjected to R, G and B color adjustment is incident on one frame of the film F and passes therethrough. At the time, the color filters must be sequentially inserted to the light passage from the light source three times to separate the image to R, G and B primary colors.

When the scanner 12 reads the image through the CCD sensor, it carries out prescan for reading the image at low resolution prior to fine scan, in which the image is read to output a photographic print, in order to determine image processing conditions and the like. After the operator (or the user) confirms and adjusts the image processing conditions on the monitor 20, the fine scan is carried out to read the image at high resolution. That is, scanning is carried out twice for the prescan and the fine scan. Accordingly, when the R, G and B color filters are provided and the CCD area sensor making use of the areal exposure is used, the scanning must be carried out a total of six times. This is because that each of the prescan and the fine scan must be carried out three times through the R, G and B color filters. Whereas, when the line CCD sensor is used, the scanning is carried out only twice, which is advantageous to prompt processing.

In the above description, all the images recorded on the film F are captured at a time in the prescan to thereby determine the image processing conditions and subsequently the fine scan is carried out. However, the prescan and the fine scan may be successively carried out to each frame of the film F.

The present invention can use various kinds of image data supply sources, in addition to the scanner 12 which optically reads an image recorded to a film such as a negative film and reversal film. Exemplified as the image data supply source is an image reading device for reading an image of a reflecting document; a communication means such as computer communication and so forth (including communication means operated through modem); a photographing device such as a digital camera, digital video camera and the like and memory contained therein; an image recording medium for digital camera such as a PC card, smart media and the like; a general-purpose image recording medium such as a FD (floppy disc), MO (magneto-optic recording medium) and the like. The image data supply source can be connected to the image processing apparatus 14 directly or through the drive unit thereof. The image processing apparatus 14 can receive digital image data and the photographing information and supplementary information of the digital image data from the image data supply source.

In particular, in the illustrated photoprinter 10, a drive unit 26 is connected to the image processing apparatus 14 in order to read and capture image data from a recording medium 25 for a digital camera to which digital image data photographed with the digital camera or the like is recorded and from a general-purpose image recording medium 25. Exemplified as the former recording medium 25 are a card memory such as a PCMCIA (PC card), ATA card, compact flash card, etc. Further, exemplified as the latter general-purpose recording medium 25 are a FD (floppy disc), CD-R (recordable compact disc), DVD (digital versatile disc), Zip, etc. Further, the image processing apparatus 14 is provided with a slot 27 or the like so that it captures digital image data and the photographing information and supplementary information thereof by being connected to various kinds of data supply sources such as the scanner, image processing device and the like of a (personal) computer, digital camera and other digital photo printer directly through a cable (for example, RS232C) or through a communication network.

In the illustrated example, input signals (digital image data, photographing information, and supplementary information) are supplied to the image processing apparatus 14 through the various kinds of the image data supply sources such as the scanner 12, the drive unit 26 and so forth. However, in the following description, a case that digital image data is supplied to the image processing apparatus 14 mainly from the scanner 12 will be described as a representative example.

The image processing apparatus 14 subjects the image data, which is captured with the scanner 12 and sent to it as digital data, to preset image processing and outputs the thus processed image data to the printer 16 or to the monitor 20. FIG. 4 shows block diagram of the image processing apparatus 14. The image processing apparatus 14 comprises a data processing section 38, a prescan memory 40, a fine scan memory 42, a prescanned image processing section 44, a finely scanned image processing section 46, a condition setting section 48 and a supplementary information capture section 62.

In the data processing section 38, the digital image data (input image data signals) associated with R, G and B, which has been delivered from the scanner 12, is subjected to Log conversion, DC offset correction, darkness correction, shading correction and so forth, and the processed prescan (image) data is stored in the prescan memory 40 and the processed fine scan (image) data is stored in the fine scan memory 42, respectively. It should be noted that A/D conversion may not be carried out by the scanner 12 and may be executed in the data processing section 38.

The prescan memory 40 and the fine scan memory 42 store the digital image data processed in the data processing section 38. The digital image data are captured to the prescanned image processing section 44 or to the finely scanned image processing section 46 as necessary so that they are subjected to the image processing and output.

The prescanned image processing section 44 comprises an image processing subsection 50 and an image data conversion subsection 52. The image processing subsection 50 is a section where correction processing is carried out such as the correction of distortion aberration and transverse chromatic aberration, which result from the aberration characteristics of a photographing lens and the correction aberration due to the drop of marginal light and an unsharp image, in addition to the execution of image processing as prior art such as color balance adjustment, contrast correction, and brightness correction, and further sharpness processing, dodging processing, and the like.

The image data conversion subsection 52 converts the image data, which was subjected to image processing in the image processing subsection 50, using a 3-D (three dimensional)—LUT and the like so that the image data can be displayed on the monitor 20.

The finely scanned image processing section 46 comprises an image processing subsection 54 and an image data conversion subsection 58.

The image processing subsection 54 subjects finely scanned image data to color balance adjustment, contrast correction (gradation processing), brightness correction through a not shown LUT (look-up table) under the image processing conditions determined based on the prescanned image data. Further, the image processing subsection 54 subjects the finely scanned image data to saturation correction through a not shown MTX operation. These operations are carried out by means of known methods. In addition, sharpness processing, dodging processing and the like are carried out as well as the correction of distortion aberration and transverse chromatic aberration, which result from the aberration characteristics of the photographing lens, and electronic scaling for magnifying and reducing an image according to the output size of a photographic print are carried out in accordance with an operator's instruction and image data and the like.

The image data conversion subsection 58 converts the image data, which was subjected to the image processing in the image processing subsection 54, using the 3-D (three dimensional)—LUT or the like so that the image data can be output to the printer 16.

The condition setting section 48 is used to read out the prescanned image data from the prescan memory 40 and to determine the image processing conditions.

Specifically, density histograms are created and characteristic quantities of an image such as its average density, LATD (large area transmission density), highlight (minimum density) and shadow (maximum density) are calculated from the prescanned image data; in addition, in response to an operator's command that is optionally issued, various operations are performed such as the creation of the table (LUT) for gray balance adjustment and the like and the generation of the matrix operation for saturation correction, whereby the image processing conditions are determined. The thus determined image processing conditions are further adjusted through the manipulating unit 18 having the keyboard 18a and the mouse 18b and set again thereby.

In addition, when supplementary information relating to at least a part of photographing information such as photographing date and time data, the photographing location and the like is to be selected, the keyboard 18a and the mouse 18b are used to designate the items of the supplementary information in response to the user's wish.

The monitor 20 is used for the operator to confirm and verify whether the image processing of the prescanned image data was properly carried out or not and connected to the image processing apparatus 14 through the image data conversion subsection 52.

FIG. 4 mainly shows the sections which relate to image processing. Disposed in the image processing apparatus 14 in addition to the above sections are a CPU for controlling and managing the digital photoprinter 10 including the image processing apparatus 14 in its entirety, a memory for storing information necessary to the operation of the digital photoprinter 10, means for determining the stop value of the variable stop 24 and the accumulating time of the CCD sensor 34 in the fine (main) scan, and the like.

The supplementary information capture section 62 is a section characteristic to the present invention. The supplementary information capture section 62 comprises a supplementary information selecting section 62a and a database section 62b. The supplementary information selecting section 62a selects supplementary information based on photographing information such as a photographing date and time, a photographing direction, a photographing magnification and the like. The database section 62b includes a database such as an encyclopedia or the like in which data to be quoted as supplementary information is accumulated, a map database used to specify an image subject in a photographed image and a photographed image database in which photographed images of famous mountains and the like are accumulated.

First, a first embodiment of a first aspect of the present invention will be described in which the supplementary information capture section 62 uses photographing date and time data such as a photographing date, a photographing time and the like as the photographing information and captures supplementary information relating to at least a part of the photographing date and time data.

In the embodiment, the supplementary information selecting section 62a of the supplementary information capture section 62 quotes data relating to at least a part of the photographing date and time data from the database section 62b, in which data to be quoted as supplementary information is stored, and selects the data as supplementary information.

FIG. 5A and FIG. 5B show the flow of supplementary information with emphasis put on the capture of it which is executed in the supplementary information capture section 62.

In the Advanced Photo System APS, at least one of a photographing date and a photographing time as the photographing date and time data, which is magnetically stored in the film F, or supplementary information, which has been recorded on the film F, is read with the magnetic reading and writing units 31 provided with the carrier 30 of the scanner 12, as shown in FIG. 5A. The thus read data is sent from the scanner 12 to the supplementary information capture section 62 through a route different from that of image data and captured thereby. The supplementary information selecting section 62a of the supplementary information capture section 62 searches and selects data from the large database section 62b such as the encyclopedia or the like, in which data to be quoted is stored, using at least one of the year, month and date of the photographing date and the photographing time as a searching basis and captures supplementary information. Further, when magnetically recorded supplementary information is read, it is possible to capture the read supplementary information as supplementary information as it is in response to the user's wish and to add it to a photographic print.

In the ordinary film of 135 size, there is a case that a photographing date and a photographing time or supplementary information are optically exposed and printed to the film F before the film F is developed, and the photographing date and the photographing time or the supplementary information is already displayed on a film image as shown in FIG. 5B. In this case, since the location where characters and the like are optically exposed and printed is approximately determined in the photographing region of the film as well as they have a high color density, they can be easily determined. Thus, the photographing date and photographing time as the photographing date and time data or the optically recorded supplementary information can be read and data can be captured by recognizing the characters from a film image by a known character recognizing technology. Further, supplementary information can be captured by searching and selecting data from the database section 62b using at least one of the year, month and date of the thus captured photographing date and time data as a searching basis. In addition, when supplementary information is read and captured by the character recognition, the read supplementary information can also be captured as it is or after it is processed in response to the user's wish.

As described above, when the digital image data is to be captured through the recording medium 25 such as the floppy disc or the like by way of the drive unit 26 or through the slot 27 by way of the communication network, the photographing date and time data recorded to the header of the digital image data or the supplementary information having been recorded thereto are read and sent to the supplementary information capture section 62. Thereafter, supplementary information is captured through the search and selection of data similarly to the Advanced Photo System APS.

For example, when the photographing date and time captured is March 3, a document and an image (a still picture) as to the Girls' Festival or a festival held in March, a bird, flower, etc. are selected. When the user designates "flower" as an item, data of a flower relating to the photographing date and photographing time is selected as supplementary information; when the user designates "news" as an item, data of news relating to the photographing date and photographing time is selected as supplementary information; and when the user designates "music" and "movie" as items, data of the name of music, the name of a movie and the like which were popular on the photographing date is selected as supplementary information.

It should be noted that the user can designate the "flower", "news", "music", "movie" and the like as user designated data in association with an image. The data can be designated in the following manners: the user directly designates it through an order sheet when he or she requests to a photo lab a simultaneous photo print output service in which photo prints are output simultaneously with the development of a negative film or requests a photo reprint output service in which only photo prints are output again; a photo lab, which provides a print output service, initially registers the database of a user and designates the item of data through the database; and when the Advanced Photo System APS is employed, the item, which is magnetically recorded to magnetic recording layers S2 by a camera or the like corresponding to the Advanced Photo System APS, is read with the magnetic reading and writing units 31 provided with the carrier 30 and the item is designated as designated data.

The data captured as supplementary information may be a figure, a symbol, an image and the like in addition to a sentence and words. For example, an figure of an analog clock having the minute hand and the hour hand may be used to display a photographing time in place of the digital display of it with numerals. Otherwise, the month and date of a photographing date may be displayed with an analog hand which is positioned on a circle one round of which represents one year or one month. Differently, a photographing date may be displayed by a calendar with week through a red circle or the like marked thereon. The information of the photographing date and time can be visually comprehended through the analog display of it, whereby the user can easily review the situation when photographing was carried out.

In the supplementary information capture section 62, the item, which is designated as user designated data, and the supplementary information, which is selected as supplementary information, can be recorded to a user management database provided in the database section 62b of the supplementary information capture section 62. The same user can be prevented thereby from selecting the same supplementary information when he or she receives a photo print output service next time. Since the user can get a different kind of supplementary information each time he or she receive photo prints, the user does not lose interest in the supplementary information and the amusement property of them can be maintained.

In the Advanced Photo System APS, data selected as supplementary information can be magnetically recorded to the magnetic recording layers S2 of the film F with the magnetic reading and writing units 31 while the film F is transported by the carrier 30 in fine scanning. With this arrangement, when an order is placed for reprints, it is possible to select other data as supplementary information to prevent the same supplementary information as the magnetically recorded supplementary information from being provided or to select the same data as the magnetically recorded supplementary information as supplementary information, in response to the user's wish.

In the ordinary negative film of 135 size, supplementary information is optically exposed and printed to the negative film before it is developed. With this arrangement, when an order is placed for reprints, the same supplementary information as the printed supplementary information can be provided, or supplementary information obtained by processing the printed data can be provided when requested by the user, whereby the supplementary information can be simply captured.

Next, a second embodiment of this aspect will be described, in which the supplementary information capture section 62 uses data such as a photographing location, a photographing direction, a photographing magnification, and the like and captures supplementary information relating to the data.

The supplementary information selecting section 62a of the supplementary information capture section 62 quotes data relating to at least a part of the photographing information such as the photographing location, photographing direction, photographing magnification and the like from the database section 62b, in which data to be quoted as supplementary information is stored, and selects the quoted data as supplementary information also in the second embodiment similarly to the first embodiment.

Figure 6:
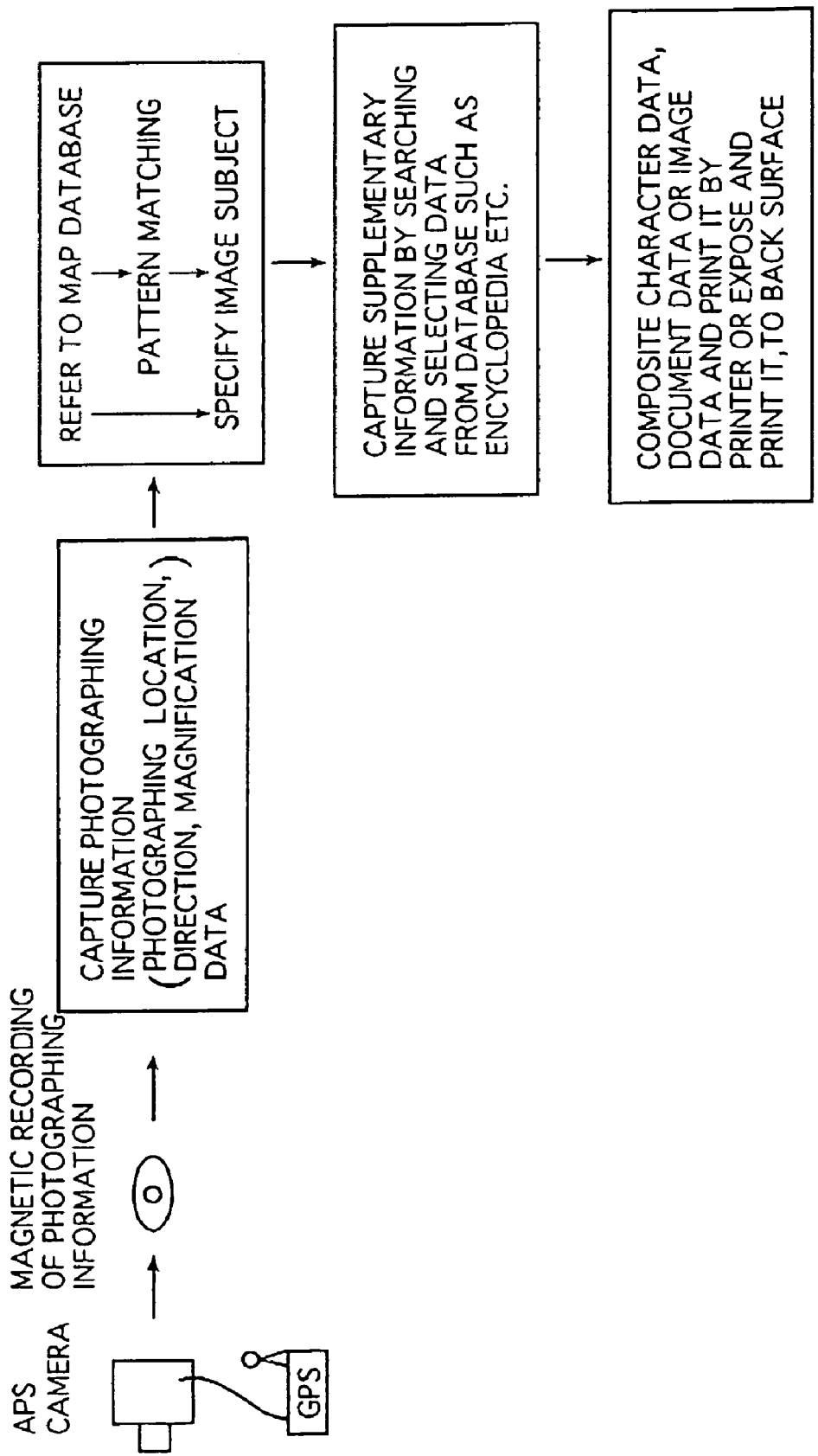
FIG. 6 is a flowchart showing another example of the flow of the image reproducing method of the present invention.

FIG. 6 shows the flow from the capture of the photographing information, which is the data and the like of the photographing location, photographing direction and photographing magnification, to the output of the photographing information as a print with emphasis put on the capture of supplementary information which is executed in the supplementary information capture section 62.

In the Advanced Photo System APS, magnetic recording layers are formed to the regions S2 of the film F corresponding to the Advanced Photo System APS shown in FIG. 3, and photographing information can be recorded to the magnetic recording layers. Accordingly, when a photograph is taken with a camera corresponding to the Advanced Photo System APS which is provided with a direction-finder-bearing indicator making use of a GPS (Global Positioning System) employing a satellite, the latitude, longitude and altitude of the location where photographing is executed as well as the photographing azimuth relating to the horizontal plane and the vertical plane can be recorded. In addition, the photographing magnification employed in the photographing can be also recorded. The recorded information is captured with the magnetic reading and writing units 31 provided with the carrier 30 of the scanner 12 and sent from the scanner 12 to the supplementary information capture section 62 through the route different from that of image data, whereby the photographing information to be obtained, as related to photographing image, including any one of a first data construction composed of the photographing location, a second data construction composed of the photographing location and photographing direction, a third data construction composed of the photographing location and photographing magnification, a fourth data construction composed of the photographing location, photographing direction and photographing magnification and the like data construction can be captured.

The subject or the photographic point (location) in the photographed image is specified referring to the map database in the database section 62b using any one of the first to fourth data constructions composed of the photographing location, photographing direction, photographing magnification and the like which are the captured photographing information. The subject and the photographic point are specified by the following manner.

For example, when the photographed image subject is a mountain, the name and the point of the mountain can be specified from the captured photographing location and direction using the map database. The position where the image subject was photographed, that is, the latitude, longitude and altitude of the position can be obtained by the use of the GPS capable of accurately finding the position based on the signals from a plurality of satellites. The measuring accuracy of the latitude, longitude and altitude is within 100 m which is practically usable. Further, an azimuth can be accurately measured with the direction-finder-bearing indicator. Accordingly, a photographed image subject and the photographic point can be specified as a subject on the map database by comparing the photographed image subject with a subject which falls into a preset image angle, which is determined depending upon photographing magnification data, on a map.

Moreover, the photographic point may include not only the point (location) of the image subject within the photographed image, that is, the photographed point (location), but also the photographing point (location) or the like where a photographer or a camera is located. This allows the photographed image to be added with information relating to the image subject within the photographed image, as well as relating to the photographic point itself as the supplementary information.

When higher accuracy is required or even if the accuracy of the photographing location, photographing direction and further photographing magnification is insufficient due to some reasons, the photographing location, photographing direction and photographing magnification can be captured accurately by making use of the map database, whereby the image subject and the photographic point can be specified in detail. That is, the photographing location, photographing direction and photographing magnification can be captured with pinpoint accuracy in the following manner: a three-dimensional computer graphic (hereinafter, abbreviated as CG) image is created by a known CG creating method from the map database based on photographing information; pattern matching is carried out between the thus created CG image and an actually photographed image, for example, pattern matching is carried out between the ridge of a mountain on the CG image, which is created from the map database based on the data of the thus obtained photographing location, photographing direction and photographing magnification and the ridge of a mountain on a photographed image while two-dimensionally moving the pixels of the CG image; and then the location, direction and further photographing magnification which enable the best matching between both the ridges are calculated. The edge of the ridge of the mountain on the photographed image is extracted from the difference of the color densities of pixels.

As described above, the location (point) where mountains are photographed, the names of respective photographed mountains and the like can be specified in detail from the map database by capturing the photographing location, photographing direction and photographing magnification with pinpoint accuracy.

When at least one of the image subject and the photographic point is specified, data to be quoted as supplementary information is searched and selected from the database such as the encyclopedia or the like in the database section 62b in response to the user's order. For example, character data, document data and audio (voice) data as to the name of the mountain only or as to the name of the mountain, the height of the mountain above sea level and the history thereof are captured as supplementary information. Furthermore, as information relating to the photographic point, information on a distance spaced apart from each of the image subjects, a distance between the photographic point and each of the image subjects or the like may be added. Further, still picture (image) data or motion-picture (moving image) data is captured as supplementary information from the photographed image database in which the photographed images of famous mountains and the like are accumulated to allow the captured data to be selected as the optimum photographed image (still picture or motion-picture). The thus captured supplementary information such as character data, document data, still picture data and the like may be composited with or added to another photographed image for outputting as a photographic print. Or otherwise, the character data, document data, audio data, still picture data, motion-picture data and the like is composited with or added to the photographed image displayed on the monitor 20 as the displaying means.

Figure 7A:
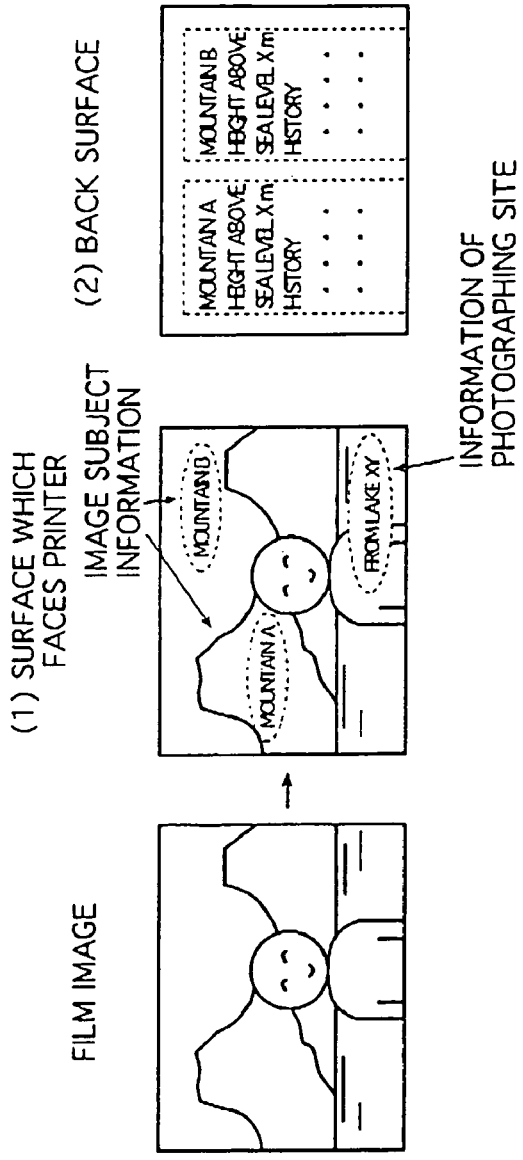
FIG. 7A and FIG. 7B are schematic views showing embodiments of photographic prints which are printed using the image reproducing method and the image reproducing apparatus of the present invention, respectively.
Figure 7B:
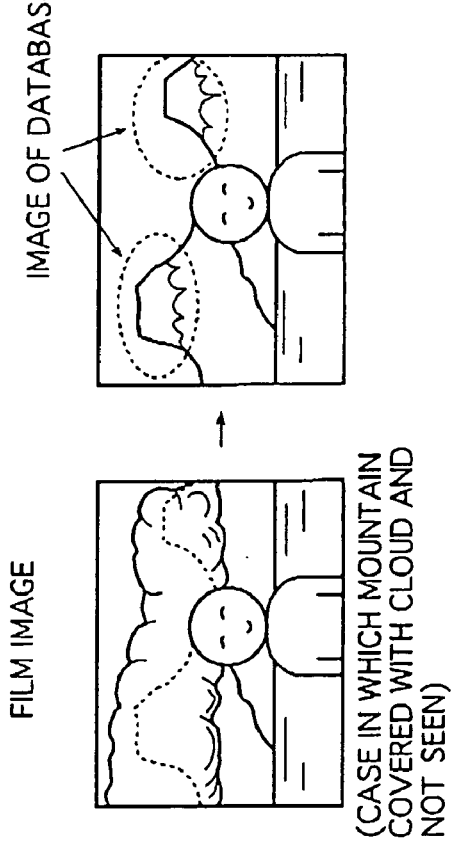

Photographic prints which are output as prints are exemplified in FIG. 7A and FIG. 7B. In the photographic print shown in FIG. 7A, information as to image subjects, that is, the names of mountains as the names of the image subjects, the name of a photographing location where the photograph was taken and the like as the information as to a photographing site are composited with a photographed image as character data. In addition, the heights on sea level of the mountains and the histories of them are quoted from the database such as the encyclopedia or the like and the document data of them is printed to the back surface of the photographic print.

The photographic print in FIG. 7B shows a case in which an image subject as a background mountain is covered with cloud and cannot be seen. In this case, an image arranged as a database, on which an image subject whose photographing information is near to the above mountain is recorded, is selected from a plurality of famous image subjects which were previously photographed and accumulated as the database in the photographed image database of the database section 62b. The selected image is corrected in accordance with the composition of the image on an exposed film and with the size of the image subject based on the photographing information and composited to the image of the exposed film. In the photographed image database, since the images of famous mountains are classified according to the photographing location and photographing directions and further according to seasons, an image arranged as the database, which is nearest to the captured photographing information such as the photographing location, photographing direction and photographing magnification and further to a photographing date and time can be selected. When the accuracy of the data of the photographing location, photographing direction, photographing magnification and the like is low, a three-dimensional CG image is created from the map database based on the data of the photographing location, photographing direction, and photographing magnification which have the low accuracy by the known CG creating method as described above, and pattern matching is carried out between the thus created CG image and the actually photographed image, whereby the photographing location, photographing direction, and photographing magnification can be captured with pinpoint accuracy.

The photographic print in FIG. 7B shows the case in which the image, in which the image subject is covered with the cloud and cannot be seen, is composited to the image subject of the image arranged as the database. However, when an image subject in a photographed image is out of focus and unsharp, the second embodiment is effective to composite the photographed image to the image subject in an image arranged as the database, in addition to the above case.

A figure relating the image subject of a photographed image or a three-dimensional CG image whose pattern is matched with that of the photographed image, for example, a contour CG image may be composited to the photographed image. Further, a scale may be composited to a photographed image in accordance with an image subject. For example, when the image subject is a mountain, a scale display, which means that 1 cm on a photographic print is 50 m in height, may be composited to the photographed image. In addition, an image arranged as the database which is nearest to a photographing site or an image and a CG image arranged the database which are photographed from an angle different from the photographing site, for example, a scene viewed from an interesting angle, a scene in a different season, a scene in an interesting season, a scene viewed from a backside, an overlooked scene, and the like may be added to the photographed image.

Further, supplementary information to be added to a photographic print may be supplementary information as to a photographing site and a photographing place, in addition to the supplementary information as to a photographed image subject. Further, measuring data such as the distance between a photographing site and each image subject and the difference between them in height above sea level, and the distance between respective photographed image subjects, and the like may be added to the photographic print as the supplementary information.

The supplementary information may be reproduced to the back surface of a photographic print of a photographed image by forming a photosensitive layer on the back side of the photographic print, exposing and printing the supplementary information on the photosensitive layer of the back side of the photographic print and then developing it. Further, when the same image subject is recorded on a plurality of frames and a lot of document data is to be added as supplementary information, the document data may be back printed to a plurality of photographic prints in the sequence of the photographing frames. The addition of the supplementary information to the photographic prints as described above more enhances the amusement property of the prints.

In the Advanced Photo System APS, supplementary information and the like as to an image subject which is specified so as to be output as a print is recorded to the magnetic recording layers formed to the regions S2 on the film shown in FIG. 3 using the magnetic reading and writing units 31 of the carrier 30. With this arrangement, when a print output service is presented next time, an image subject can be simply specified and data to be quoted as supplementary information can be simply searched.

It should be noted that the information as to the photographing location may be photographing location information which is obtained making use of a method other than the GPS. For example, an image subject can be easily specified by means of a camera similar to field glasses, which are positionally fixed but directionally movable and installed in an observation platform in a tourist resort, because at least a photographing location is accurately known.

Further, Japanese Patent Application No. 9-245748 filed by the applicant discloses the technology of a digital bit pattern recorded with a digital data recording camera. The supplementary information capture section 62 may reversely send the supplementary information captured with the supplementary information selecting section 62a to the scanner 12 and the supplementary information may be printed to the portion of a frame of the film F to which no image is recorded and which is not yet developed as shown in FIG. 8. With this operation, a digital data recording frame arranged as a digital bit pattern can be provided. Thus, when a film development service and a simultaneous photo print service are presented, data based on a photographing date and photographing time can be written to a digital data section 3D as supplementary information. Further, when information such as a photographing image subject and the like are known beforehand, supplementary information based on a photographing location and direction may be written to the digital data section 3D. There is provided identification data D1 to determine the digital data frame when the supplementary information is written to the film.

In the aforesaid example, a photographed image is reproduced as a visible image on the front surface of a photographic print, and supplementary information relating to photographing information is composited to the reproduced image on the front surface which is reproduced from photographed image, printed to the back surface of the photographic print by a printer or exposed and printed to the back surface thereof. However, the present invention is not limited to the case in which the supplementary information is added to the photographic print as described above, and, for example, the supplementary information may be added to a visible reproduced image (soft copy image) at the step in which the visible image reproduced from the photographed image is displayed.

For example, a display monitor such as the monitor 20, a projector, photo player and the like can be exemplified as the display means. These display means can simultaneously display both of the photographing information and the supplementary information thereon or display them one after another by switching them after they are subjected to reproduction processing.

For example, the monitor 20 displays a visible image reproduced from a photographed image as well as displays supplementary information composited to a visible reproduced image (displayed image) which is displayed in accordance with the image reproducing method of the present invention. Otherwise, the monitor 20 can be also used as a display means (display) for displaying supplementary information by linking it to a displayed image. The link of the displayed image to the supplementary information and the display of the supplementary information is not particularly limited. That is, supplementary information, which is to be added to displayed image, may be displayed to a part of an image displayed on the screen of the monitor 20, to a part of the screen or to the entire screen by clicking a menu bar or a preset portion, for example, an image subject on the screen of the monitor 20 with the mouse 18b or the like. Otherwise, the supplementary information may be output in voice by means of an audio output means 21 such as a speaker or the like. Exemplified as the supplementary information to be added to the displayed image are, for example, a visible reproduced image displayed on the screen, the situation in which the subject has been photographed, and information explaining the subject itself and the like. It is noticed that the photographing situation means date and time, place or the like when the subject has been photographed.

In the present invention, it is needless to say that a computer having a display, an audio output means and the like may be connected to the image processing apparatus 14 in addition to the monitor 20, and a composite image, to which supplementary information is composited by the image reproducing method of the present invention or supplementary information linked to a displayed image may be displayed or may be output in voice by means of the personal computer. When a photo player having a purpose of reproducing an image on an image display device (monitor) is used, an ordinary photographed image is subjected to preset image processing depending upon the result of determination of a type of a frame and output to the image display device of the photo player. Whereas, in the digital bit pattern (digital data recording frame), data (supplementary information and the like) is decoded depending upon the data and output as supplementary information. In this case, an animation or a motion-picture (movie) and voice may be used as the supplementary information, in addition to a sentence, words, a figure and a symbol. The animation is output through the image display device and the voice is output from a voice output means such as a speaker or the like.

Further, a digital image data, to which supplementary information is added, is reproduced in the printer 16 as an image and output as a photograph print. In addition to the above, the digital image data can be also recorded to an image recording medium such as a floppy disc, MO, Zip, and the like by a drive unit 26. When the digital image is to be reproduced at the time, the photo player and a personal computer can capture the image to which the supplementary information is added from the image recording medium and display it on an image reproducing device. In addition, the supplementary information such as commentary information and the like as to a photographing situation of the photographed image and an image subject can be called out by designating the image subject specified on the image reproducing device with the mouse and the supplementary information can be displayed on the image display device.

The printer 16 outputs a photographed image as a reflective positive image (hardcopy image) which is printed to a reflective type monochrome or color light-sensitive material such as a photographic paper or the like. However, the present invention is not limited thereto, and the printer 16 may output the photographed image as a translucent positive image (soft copy image) through a translucent type monochrome or color light-sensitive material such as a reversal film and an overhead projector film for. In this case, a translucent positive image to which supplementary information is composited may be output and a resultant translucent positive image may be projected through a projector so as to display a visible reproduced image on a screen. At the time, supplementary information may be output in voice simultaneously with the reproduction of a photographed image through the projector.

Projectors to be employed in the present invention may include not only an ordinary projector for projecting the film, but also a projector capable of projecting the film with a structure in which a liquid crystal display (LCD) unit is provided in place of the film at the location where the film is otherwise provided and is allowed to display the image thereon and to transmit the light therethrough for obtaining the transmitted light which is then projected on a screen.

In the aforesaid example, photographing information and supplementary information are captured and recorded by making use of at least one of the magnetic recording of them to the magnetic recording layers corresponding to a photographing frame of the APS film; the optical recording of them to a photographing frame of the photographic film; the recording of them to a photographing frame of the IC memory of the film cartridge provided with the IC memory; and the recording (header record) of digital image data to a photographing frame of the image recording medium for a digital camera or to a photographing frame of a general purpose image recording medium. However, the present invention is not limited to the physically integral recording of the photographed image or the photographed image data with the photographing information or the supplementary information, and the photographed image and the photographed image data may be recorded separately from the photographing information and the supplementary information.

When a photographed image data recording section, where a photographed image or photographed image data is recorded, is physically separated from an information recording section, where photographing information or supplementary information is recorded, photographing frame identifying information and the photographing information or the supplementary information are arranged as a set. With this arrangement, the photographing information and the supplementary information can be recorded to a conventionally known data recording medium, for example, a FD, CD-R, MO, DVD and the like. In addition, they can be recorded as a database to, for example, the database section 62b of the supplementary information capture section 62 so that it is managed at a lab or can be recorded to a designated recording section through a communication network.

When a photographed image is recorded to, for example, the photographic film such as the APS film or the film of 135 size, identification information such as film ID or cartridge ID and photographing frame number information can be used as the photographing frame identification information used in the above separated recording. In addition, when the digital image data of a photographed image is recorded as in a digital camera, an image file name can be used as the photographing frame identification information.

The image processing apparatus 14 of the digital photoprinter 10 of the embodiment of the image reproducing apparatus of the first aspect of the present invention is basically arranged as described above. The operation of the image processing apparatus 14 and an image reproducing method of the first aspect of the present invention will be described below.

Prescanned image data, which is prescanned and captured with the scanner 12, is subjected, as digital input image data, to various kinds of processing such as Log conversion, DC offset correction, dark correction, shading correction and the like in the data processing section 38 and then stored in the prescan memory 40. The prescanned image data stored in the prescan memory 40 is captured to the condition setting section 48, where an image characteristic amount and the like are calculated, whereby image processing conditions are automatically determined. After the image processing conditions are adjusted in response to the user's instruction, the prescanned image data is subjected to color balance adjustment, color density correction, brightness correction, contrast correction and saturation correction and further to the correction of aberration such as transverse chromatic aberration, distortion aberration and the like, which are caused by a photographing lens in the image processing subsection 50 of the prescanned image processing section 44 under the thus determined image processing conditions. In addition, after the prescanned image data is subjected to sharpness processing and dodging processing (compression/expansion of the dynamic range of densities) in response to the operator's instruction, it is sent to the image data conversion subsection 52. In the image data conversion subsection 52, the prescanned image data is converted using the 3-D (three-dimensional)—LUT and the like and processed to image data suitable for displaying and displayed on the monitor 20.

In a digital image photographed with the digital camera or the like, image data can be captured from the image recording medium such as the floppy disc, MO, Zip and the like through the disc drive unit. The image data can be also captured from the communication network. At the time, the image data is stored in the prescan memory 40 and in the fine scan memory 42, and subsequent image processing is carried out similarly to the image data captured with the scanner 12.

As described above, the image processing for the correction and the like of the prescanned image data is carried out, whereas the supplementary information capture section 62 captures supplementary information at the same time.

In the Advanced Photo System APS, the photographing information such as the photographing date and time, photographing location, photographing direction, photographing magnification and the like which includes at least one of the photographing date and the photographing time as the information, which was read with the magnetic reading and writing units 31 provided with the carrier 30 of the scanner 12 and recorded to the magnetic recording layers S2 of the film, is sent to the supplementary information capture section 62 through the route different from that of image data.

In the first embodiment of this aspect, the supplementary information selecting section 62a selects data relating to at least a part of the photographing date and the photographing time from the large database section 62b such as the encyclopedia or the like as supplementary information.

In the ordinary film of 135 size other than the Advanced Photo System APS, when the photographing date and the photographing time are optically exposed and printed to the film F, since the location at which the optically exposed and printed characters are approximately determined in a photographing frame of the film and further the color density of the characters is also high, the characters can be easily determined. Thus, the characters showing a year, month, date and time are read out from a film image by means of the known character recognizing technology. Then, data is searched and selected from the large database section 62b such as the encyclopedia or the like using at least one of the year, month, date and time as a searching basis and supplementary information is captured thereby.

When the supplementary information, which was magnetically recorded to the magnetic recording layers S2 in a previous service, is captured therefrom in a photo reprint service, the captured supplementary information is used as it is as supplementary information or other data is searched from the database section 62b and selected as supplementary information, in response to the user's wish. In addition, when supplementary information is optically exposed and printed to the film, the read supplementary information is used as it is or used after it is processed.

The item of the user designated data is designated in the following manners: the operator designates the item, which is directly designated by the user, through the keyboard 18a and the mouse 18b when the user requests a photo print output service; the item is designated in reference to the data base of the user which was previously registered; and in the Advanced Photo System APS, the item is designated by reading the user designated data, which is recorded to the magnetic recording layer S2 formed on the film F by the camera or the like corresponding to the Advanced Photo System APS, with the magnetic reading and writing units 31.

On the other hand, in the first embodiment of this aspect, the supplementary information selecting section 62a specifies the image subject in a photographed image by referring to the map database in the database section 62b based on the captured photographing location, photographing direction and photographing magnification, and, when necessary, by executing pattern matching between a three-dimensional CG image created referring to the map database and a photographed image. Further, character data, document data and further image database as to the specified image subject are searched and selected from the database section 62b. The character data and document data are searched and selected from the database such as the encyclopedia or the like, and the image data is searched and selected from the photographed image database of previously photographed famous mountains and the like.

When the content as to the supplementary information, which was magnetically recorded to the magnetic recording layers S2 in a previous photo reprint service, is captured from the magnetic recording layers S2 in a reprint service, supplementary information can be added in accordance with the content of the read supplementary information, whereby the supplementary information can be simply searched and selected.

How the selected supplementary information is added to a photographic print is designated by the operator through the manipulating unit 18 having the keyboard 18a and the mouse 18b. For example, when a photographed image subject is a mountain, the user designates whether only the name of the specified mount is added to the photographic print or the name of the mountain, the height of it above sea level and the history thereof are back printed to only the back surface of the photographic print.

While the first embodiment and the second embodiment are separately described in this aspect, it is needless to say that the present invention is not limited to embody them separately and they may be embodied together.

A prescanned image is confirmed and examined on the monitor 20 and further supplementary information to be added is captured. Then, after how the supplementary information is added to the photographic print is designated, an image is captured through fine scan under the set image processing conditions. The finely scanned image is subjected to image processing in the data processing section 38 similarly to the prescanned imaged data and stored in the fine scan memory 42 as finely scanned image data.

The image processing subsection 54 reads out the finely scanned image data stored in the fine scan memory 42 therefrom and subjects it to color balance adjustment, brightness correction, contrast correction and saturation correction and further to the correction of aberration such as transverse chromatic aberration, distortion aberration and the like which is caused by the photographing lens. In addition, electronic scaling is carried out in accordance with the output size of a photographic print and further sharpness processing and dodging processing (compression/expansion of the dynamic range of densities) are carried out in response to the operator's designation.

When the supplementary information captured in the supplementary information capture section 62 is composited to the photographed image, character data, document data and image data are captured and the character data and the document data are extended to a bitmap, when necessary. Then, the respective ones of the data are supplied to the finely scanned image processing subsection 54 and composited to the photographed image.

After various kinds of image processing are applied to the image in the image processing subsection 54, the image is sent to the image data conversion subsection 58 and subjected to image conversion in it. Subsequently, the resultant image is processed to image data which is suitable to be output to the printer 16 and then output to the printer 16. Further, when it is selected in the supplementary information capture section 62 to back print the character data and the document data, the character data and the document data as supplementary information are sent to the printer 16 as they are.

The printer 16 comprises a recording device (print device) for exposing a light-sensitive material (photographic paper) and recording a latent image on it and a processor (development device) for subjecting the exposed light-sensitive material to preset processing and outputting it as a photographic print.

In the recording device, the light-sensitive is cut to a preset length in accordance with the photographic print. Then, the character data and document data and further the character data and document data as to a specified image subject, which are sent from the condition setting section 48 of the image processing apparatus 14 and captured in the supplementary information capture section 62, are printed to the back surface of each cut light-sensitive material with a back print means such as a dot impact printer, ink ribbon printer or the like in the form of characters and line images. In some cases, they are exposed and printed to the back surface of each cut light-sensitive material in the form of characters and images. Subsequently, three kinds of light beams for R exposure, B exposure and B exposure, which correspond to the spectral sensitivity characteristics of the light-sensitive material, are modulated in accordance with the image data supplied from the image processing apparatus 14 and deflected in the main scanning direction as well as the light-sensitive material is transported in the auxiliary scanning direction perpendicular to the main scanning direction. With this operation, the light-sensitive material is two-dimensionally scanned and exposed and a latent image is recorded on the light-sensitive material. Then, the light-sensitive material is supplied a processor. When it is selected in the supplementary information capture section 62 to composite supplementary information to the image, since the supplementary information has been composited to the image in the image processing subsection 54, a latent image is recorded similarly to an image to which supplementary information is not composited. The processor, which has received the light-sensitive material, subjects it to preset wet development processing such as color development, bleach-fixing, rinsing and so forth and dries it. Then, the processor sorts and accumulates the respective light-sensitive materials as photographic prints corresponding to a preset unit such as one piece of film.

As described above in detail, according to the first aspect of the present invention, the preset image processing is applied to digital image data, which is captured from an image recorded on a photographic film, with the scanner or to the digital image data obtained by photographing with a digital camera or the like to thereby obtain output image data. When an image corresponding to the output image data is output as a photographic print and/or a displayed image, photographing information is captured in association with the photographed image. For example, in the first embodiment, photographing information, which includes at least a part of photographing date and time data, is captured, and in the second embodiment, photographing information, which at least includes a photographing location, and optionally further includes at least a part of photographing direction and photographing magnification, and the like is captured. Then, supplementary information, which relates to at least a part of the thus captured photographing information, is captured and added to a photographic print and/or the displayed image. With this arrangement, there can be presented a photographic print and/or a displayed image to a user who can easily or intuitively review, on looking at the photographic print and/or the displayed image, the situation in which the image printed on it was photographed. In addition, the photographic print and/or the displayed image has a function as a memo, is excellent in practicality, includes an amusable image in accordance with the user's taste and further has an excellent amusement property.

The image reproducing method and apparatus of the first aspect of the present invention is basically arranged as described above.

Next, an image processing method and apparatus of a second aspect of the present invention will be described with reference to FIG. 9 to FIG. 11.

FIG. 9 shows a block diagram of an embodiment of the image processing apparatus of the present invention for embodying the image processing method of the second aspect of the present invention.

An image processing apparatus 15 shown in FIG. 9 is applied to the digital photoprinter 10 shown in FIG. 10 in place of the image processing apparatus 14 of the first aspect shown in FIG. 1. The image processing apparatus 15 has the same arrangement as that of the image processing apparatus 14 shown in FIG. 4 except that image processing apparatus 15 has an image subject specifying section 64 and a similarity determination section 66 in place of the supplementary information capture section 62 and that the arrangements of the image processing subsection 50 of the prescanned image processing section 44 and the image processing subsection 54 of the finely scanned image processing section 46 are shown in more detail. Accordingly, the same numerals as used in the image processing apparatus 14 are used in the image processing apparatus 15 to denote the same components and the detailed description of them are omitted.

It should be noted that the similarity of image frames is determined by the prescan of an image which is executed by the CCD sensor 34 in a scanner 12 in order to that image processing conditions are determined in accordance with the result of the determination and confirmed and adjusted on a monitor.

As shown in FIG. 9, the image processing apparatus 15 subjects input image data, which is digitized by the scanner 12, to preset image processing and outputs the resultant digital input image data to a printer or an image display device. The image processing apparatus 15 comprises a data processing section 38, a prescan memory 40, a fine scan memory 42, a prescanned image processing section 44, a finely scanned image processing section 46, a condition setting section 48, the image subject specifying section 64, and the similarity determination section 66.

The prescanned image processing section 44 comprises an image processing subsection 50 and an image data conversion subsection 52 similarly to the above embodiment. The image processing subsection 50 comprises a LUT/MTX operation unit 49 and an image correction unit 51. The LUT/MTX operation unit 49 carries out color balance adjustment, contrast correction and color density correction. The image correction unit 51 carries out the correction of aberration such as transverse chromatic aberration, distortion aberration and the like, which are caused by the aberration characteristic of a lens and further sharpness processing, dodging processing and the like.

The finely scanned image processing section 46 also comprises an image processing subsection 54 and an image data conversion subsection 58 likewise the above embodiment. The image processing subsection 54 comprises a LUT/MTX operation unit 53 and an image correction unit 56.

The LUT/MTX operation unit 53 subjects finely scanned image data to color balance adjustment, contrast correction (gradation processing) and color density correction through a LUT (look-up table) and to saturation correction through a MTX operation, under the image processing conditions determined based on prescanned image data. In the color density correction, the images of the photographing frames, which have been determined to be similar frames, are subjected to preset color density correction having the same color density. The image correction unit 56 carries out the correction of distortion aberration and transverse chromatic aberration, which result from the aberration characteristics of a photographing lens, electronic scaling for magnifying and reducing an image in accordance with the output size of a photographic print and further sharpness processing, dodging processing and the like.

The condition setting section 48 is used to determine the image processing conditions based on the prescanned image data read from the prescan memory 40 similarly to the above embodiment. The thus determined image processing conditions are further adjusted through a manipulating unit 18 to thereby set the image processing conditions again. Further, the image of a frame, which is determined to have similarity by the similarity determination section 66, can be determined by a monitor 20. When the determination of similarity must be corrected, it is corrected through the manipulating unit 18, whereby the image processing conditions of the similar frame are determined.

The monitor 20 confirms and examines whether the image processing of the prescanned image data is properly carried out or not. Th monitor 20 is further used to determine the similarity of the frame of each image to be described later and connected to the image processing apparatus 15 through the image conversion subsection 52.

The image subject specifying section 64 and the similarity determination section 66 are sections characteristic to the present invention. The image subject specifying section 64 specifies a photographed image subject based on photographing information such as a photographing location, a photographing direction of a camera (hereinafter, simply referred to as a camera direction), a photographing magnification and the like supplementary similarly to the supplementary information capture section 62 in the second embodiment of the first aspect. The similarity determination section 66 determines whether the specified image subject is similar to the image subject of the image of a frame to be compared with it or not. Otherwise, the similarity determination section 66 determines a degree of similarity between photographing frames as to two kinds of corresponding photographing information of an image frame to compare and an image frame to be compared by means of weighted means values of absolute values of differences between photographing locations, between camera directions and between photographing magnifications. When the weighted means value are less than a threshold value, it is determined that similarity exists between the photographing frames and that they are similar frames. The detailed functions of the image subject specifying section 64 and the similarity determination section 66 will be described later.

In the image processing apparatus 15 of this aspect, after the image subject specifying section 64 specifies an image subject, the similarity determination section 66 determines similarity between respective photographing frames. However, the image subject specifying section 64 and the similarity determination section 66 may be disposed in reverse sequence so that the similarity determination section 66 determines similarity between respective photographing frames first and then the image subject specifying section 64 specifies an image subject.

The image processing apparatus of this aspect is basically arranged as described above. The operation of the image processing apparatus 15 of this aspect shown in FIG. 9 and the image processing method of this aspect will be described below.

The rescanned image data which is read from a film F through the prescanning executed by the scanner 12 shown in FIG. 1, and the input image data such as digital data and the like, which is photographed with a digital camera or the like, is stored in an image recording medium and is read out therefrom, are stored once in a prescan memory 40 in the same manner as the aforesaid image processing apparatus 14 of the first aspect of the present invention; the prescanned image data and the input image data are read out to the image processing subsection 50 of the prescanned image processing section 44 and subjected to preset image processing; then they are sent to the image conversion subsection 52, are converted by it to data suitable for displaying and displayed on the monitor 20.

At the time, in this aspect, the image subject specifying section 64 and the similarity determination section 66 determine the similar frames between photographing frames using photographing information such as a photographing location and camera direction and further a photographing magnification and the like.

FIG. 10 conceptually shows a flowchart of an example of the image processing method of a second embodiment o the present invention.

Photographing information is read out and captured with a magnetic reading and writing units 31 provided with the carrier 30 of the scanner 12 and sent to the image subject specifying section 64 through a route different from that of image data in the same manner as the aforesaid image processing apparatus 14. The photographing information includes information such as a photographing location (latitude, longitude and height) which is recorded to the magnetic recording mediums of the regions S2 of the film corresponding to the Advanced Photo System APS shown in FIG. 3 using a GPS, a direction-finder-bearing indicator assembled to a camera and the like; a camera direction (azimuth angle of a camera as to a horizontal plane and a vertical plane); photographing magnification data, and the like. The image subject specifying section 64 includes database (not shown) which is similar to the database section 62b of the supplementary information capture section 62 of the aforesaid image processing apparatus 14. The image subject specifying section 64 specifies the name of a photographed image subject on a map based on the captured photographing location, camera direction and magnification data with reference to the database. The photographing location and the camera direction have sufficient accuracy in practical use as described above. Accordingly, the photographed image subject can be specified as a subject on the map by comparing a subject which falls into a preset image angle, which is determined depending upon the photographing magnification data, on the map with the photographed image subject.

Further, when higher accuracy is required or even the accuracy of photographing information is insufficient, the photographing information such as the photographing location, camera direction, photographing magnification and so forth can be determined with pinpoint accuracy by creating a three-dimensional CG image using map database based on the photographing information captured and carrying out pattern matching between the thus created CG image and an actually photographed image. An image subject can be specified in detail thereby as described above.

The location where mountains are photographed and the name of each photographed mountain can be specified in detail from the map database by finding the photographing location, camera direction and photographing magnification with pinpoint accuracy.

The name specified on the map by the image subject specifying section 64 is sent to the similarity determination section 66 together with the photographing information such as the photographing location, camera direction, photographing magnification and the like which are recorded to each frame.

Figure 11A:
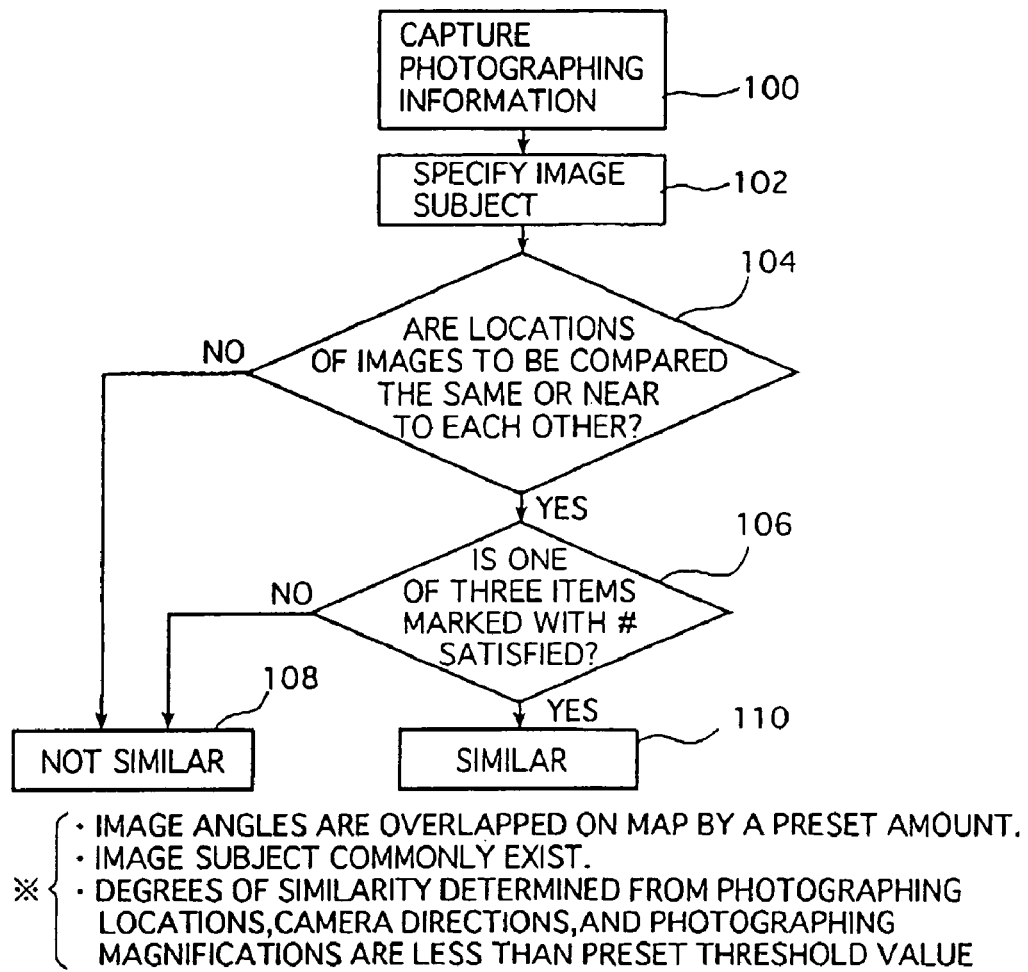
FIG. 11A is a flowchart showing an example of the similar frames determining flow of the image processing method as the present invention and FIG. 11B is a flowchart showing an example of another similar frames determining flow of the image processing method as the present invention.
Figure 11B:
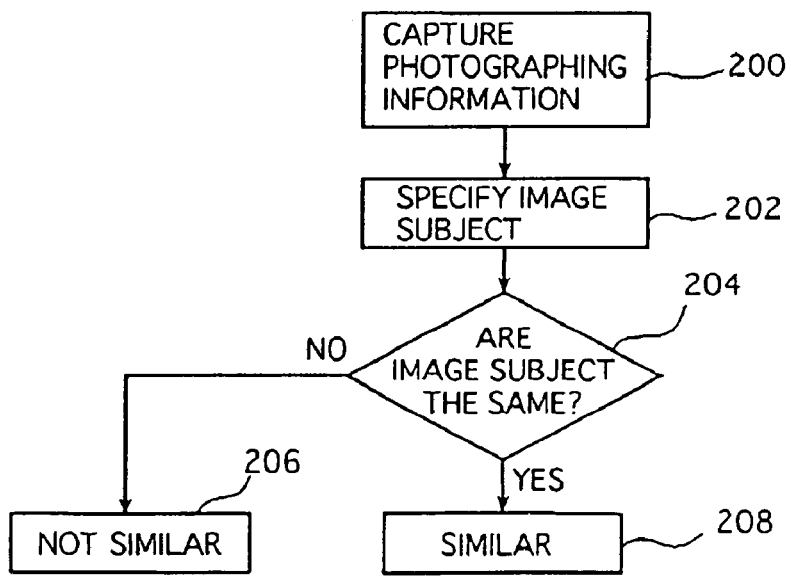

The similarity determination section 66 determines the similarity of photographing frames. FIG. 11A and FIG. 11B show flowcharts for two kinds of similarity determination methods executed in the similarity determination section 66 together with the specification of an image subject effected in the image subject specifying section 64, with emphasis put on the similarity determination.

First, in the method shown in FIG. 11A, photographing information such as a photographing location, camera direction and photographing magnification is captured (step 100 in FIG. 11A). An image subject is specified from map database using the photographing location, camera direction and photographing magnification (step 102 in FIG. 11A). Further, attention is paid to the photographing location in the photographing information and it is examined whether or not the photographing location of an image to compare is the same as or near to the photographing location of an image to be compared (step 104 in FIG. 11A). Whether the former location is near to the latter location is determined depending upon whether the distance therebetween is less than a preset threshold value or not. As a result of determination, when the former location is not the same as or not near to the latter location, it is determined that the image to compare has not similarity (hereinafter, referred to as non-similarity) (step 108 in FIG. 11A). When it is determined that the former location is the same as or near to the latter location, it is determined whether image angles are overlapped on a map by a preset amount or not; whether or not a main image subject, which is specified in the image subject specifying section 64, commonly exists in the images to be compared with each other; or whether or not a degree of similarity between a photographing frame to compare and a photographing frame to be compared is or less than a preset threshold value, for example, whether or not the weighted means values of the absolute values of the differences between photographing locations, between camera directions and between photographing magnification data in the photographing information of images are less than preset threshold values (step 106 in FIG. 11A). When the image to compare does not satisfy any of the above three conditions, it is determined that the image has non-similarity (step 108 in FIG. 11A). When the image to compare satisfies at least any one of the conditions, it is determined that the image has similarity (step 110 in FIG. 11A). The degree of similarity may be any other arithmetic mean value or geometric mean value such as the weighted means value of the square values of the differences between photographing locations, between camera directions and between photographing magnification data.

Similarity can be determined by means of the overlap of the image angles on the map, which is one factor of the conditions for determining similarity in the following manner. That is, the range of a photographed image angle can be determined on the map using the azimuth of a camera with respect to the horizontal plane and vertical plane. Thus, when the image angel of a photographed image to compare overlaps with the image angle of a photographed image to be compared, which is determined using the azimuth of the camera of the photographed image to be compared and the photographing magnification thereof in a range larger than a preset value, it is determined using the above information as to the determination of the photographed image angle that at least photographed image subjects are the same. With this method, it is determined that similarity exists between main image subjects to which attention must be paid. For example, it is determined that similarity exists between a case in which the image of a person is located at a center and Mt. Fiji is located backward of the person on a right end and a case in which the image of a person is located on a left end and Mt. Fiji is located at a center.

Further, image subjects are photographed at the same location or at locations neat to each other and the photographed and specified image subjects are the same, it is determined that similarity exists therebetween regardless of the compositions of the images.

As to the degree of similarity which is another factor of the conditions for determining similarity, similarity can be quantitatively determined because a photographing location can be numerically represented using a longitude and latitude; a camera direction can be numerically represented using an angle between two directions on the horizontal plane and vertical plane; and a photographing magnification can be numerically represented by a magnification value. Thus, similarity between an image to compare and an image to be compared can be determined in the following manner. That is, the weighted mean values of the absolute values of the differences between the photographing locations of the images, between the camera directions of them and between the photographing magnification data thereof are calculated; each of the calculated weighted mean values is used a degree of similarity between photographing frames; and the similarity therebetween can be determined depending upon whether each weighted mean value is less than a preset threshold value or not.

The degree of similarity Dij is represented by the following formula.

$$Dij = \sum_{ij} = (Ap \times |Xpi - Xpj|)$$

where, Ap shows a weighting coefficient for the item p of photographing information such as the photographing location, camera direction and the like and is preset. Xpi shows numeral data corresponding to the item p of an i-th image frame, and Xpj shows numeral data corresponding to the item p of a j-th image frame. The reason why the absolute value of the difference such as |Xpi−Xpj| is used is to remove a negative symbol by supposing a case that the difference value becomes negative. Further, the grand total of all the items P is determined, that is, the grand total of Ap×|Xpi−Xpj| as to the photographing location, camera direction and photographing magnification is determined to thereby calculate the degree of similarity Dij.

The square value of a difference may be used as shown in the following formula as the degree of similarity Dij in place of the absolute value of the difference as shown in |Xpi−Xpj|.

$$Dij = \sum_{ij} (Ap \times (Xpi - Xpj)^2)$$

When the square value is used, a photographing frame having a higher degree of similarity has a smaller value of the degree of similarity Dij. When photographing frames are the same, the values of the degree of similarity Dij of them perfectly become zero. As a result, when the degree of similarity between photographing frames is less than a preset threshold value, it is determined that similarity exists therebetween.

While the photographing location, camera direction and photographing magnification data are used as the item p of the photographing information, other photographing information, for example, a photographing time may be added as a factor for calculating the degree of similarity between photographing frames. Further, items such as a luminance value, which is obtained by measuring the luminous quantities of a plurality of different areas on an image subject when it is focused or when it is photographed to determine an exposure value in photographing, a distance to an image subject, a focused distance of an image subject, a stop value, a shutter speed and whether an electronic flash is used or not may be added as factors for calculating the degree of similarity Dij.

FIG. 11B shows another method for determining similarity.

A photographing location, camera direction and photographing magnification as photographing information are captured (step 200 in FIG. 11B), and the photographed image subject in each image is specified from the photographing information in the image subject specifying section 64 (step 202 in FIG. 11B). Thereafter, it is determined whether the image subjects in photographed images to be compared are the same or not (step 204 in FIG. 11B). When the image subjects are not the same, they are determined to have non-similarity (step 206 in FIG. 11B). Whereas, when the image subjects are the same, they are determined to have similarity (step 208 in FIG. 11B).

When they are determined similar to each other, the similarly of them may be further determined in consideration of a photographing time zone, if a photographing time is available as the photographing information. That is, even if the same image subjects exist in similar scenes, when the time zone, in which the scenes are photographed, is within the same range covering a preset extent, the scenes are determined similar. Whereas, when the time zone is not within the same range, the scenes are determined non-similar. With this operation, when the photographing times are non-similar even if the image subjects are the same, a color density can be adjusted in consideration of the passage of time so that no contradiction arises between brightness depending upon a time zone and the brightness of finished print.

The execution of the method shown in FIG. 11B enables the photographing frames, which are determined non-similar by the method shown in FIG. 11A because the photographing locations of photographed images to be compared are not the same or are not near to each other, to be determined similar. Further, the method shown in FIG. 11A may be suitably combined with the method shown in FIG. 11B.

As described above, the degrees of similarity between the respective photographing frames are calculated as to all the photographing frames of a film, and whether the frames are similar or non-similar is determined. Photographing frames which are determined similar are stored in the group to which a photographing frame compared with them belongs. A reason why the similarity and non-similarity are determined as to all the photographing frames of the film is that similar frames are not always located adjacent to each other on the film. When a photographing frame to compare is similar to a photographing frame to be compared and the photographing frame to be compared already belongs to a certain group, the photographing frame to compare must belong to the group. One or a plurality of groups of similar frames are formed as described above, and the numbers of the photographing frames are stored in a memory for each group as well as sent to the condition setting section 48.

As described above, the prescanned image data is captured from the prescan memory 40 and subjected to various kinds of image processing in the image processing subsection 50 of the prescanned image processing section 44 under the image processing conditions which are automatically determined in the condition setting section 48 and adjusted in response to the instruction issued through the manipulating unit 18 when necessary and then displayed on the monitor 20.

At the time, the photographing frames which are determined similar frames in the similarity determination section 66 are surrounded with enclosures of the same color so that they can be identified as the similar frames when they are displayed on the monitor 20. Thus, on looking at the screen displayed on the monitor 20, the operator can finally check whether photographing frames are similar or not. When the operator visually determines that a photographing frame has non-similarity, the operator can carry out adjustment for removing the photographing frame from a similar frame group through the manipulating unit 18.

The operator finally checks similar frames and confirms and examines whether the image processing conditions are proper or not for the prescanned image on the monitor 20. With this operation, the groups of the similar frames are fixed and the image processing conditions are also fixed.

The condition setting section 48 sets processing conditions for executing color density correction so as to apply similar image processing to similar frames in order to that the qualities of the images reproduced from the images photographed to similar frames are made identical, that is, the color densities thereof are made identical.

More specifically, the exposure of all the images (mean exposure of all the frames) is calculated for the respective similar frames which belong to the same group, and further the mean value of the thus determined exposure of the respective similar frames is determined. Then, the processing conditions of each similar frame are determined so that the thus determined average value of the exposure is used as the exposure of each similar frame, that is, the mean exposure of all the frames is made identical. Then, each pixel unit of a frame to be subjected to correction processing is corrected by adding the difference between the means value of the exposure of each similar frame in the same group to which each frame belongs and the exposure of all the similar frames to which the processing conditions are to be determined to the exposure of the pixel unit to be corrected.

The reason why the exposure is used in the correction processing to obtain the same color density is that color density is controlled by the exposure in an output printer. After the image processing conditions are examined by the operator, an image is main scanned and captured with the scanner 12 under the image processing conditions having been determined. The resultant main scanned image data of high resolution is sent from the scanner 12 to the image processing apparatus 15. Then, the main scanned image data is subjected to A/D (analog/digital) conversion, Log conversion, DC offset correction, darkness correction shading correction and so forth in the data processing section 38 similarly to the prescanned image data and stored in the fine scan memory 42 as the finely scanned image data.

In the image processing subsection 54 of the finely scanned image processing section 46, the thus stored main scanned image data is read out from the fine scan memory 42 to the LUT/MTX operation unit 53, where it is subjected to color balance adjustment, color density adjustment, contrast correction and saturation correction under the image processing conditions having been determined. At the time, it is determined whether a photographed image to be finely scanned belongs to any of the similar frame groups or not by checking the frame numbers of each group stored in the memory. When the photographed image belongs to any one of the groups, it is processed under the color density correction processing conditions set to the group. When the photographed image is an image of a non-similar frame which does not belong to any group, it is subjected to ordinary color density correction.

Further, the finely scanned image data is sent the image correction unit 56, where it is subjected to the correction of distortion aberration and transverse chromatic aberration, which is caused by a photographing lens, to electronic scaling for magnifying and reducing an image in accordance with the output size of a photographic print, and further to sharpness processing and dodging (compression/expansion of the dynamic range of densities) in response to the user's instruction.

After the finely scanned image data is subjected to the various kinds of processing in the image processing subsection 54, it is sent to an image data conversion subsection 58 for image conversion. Subsequently, the finely scanned image data is processed to output image data which is suitable to be output to the printer 16 and then output to the printer 16.

As to the similar frames, when image subjects are the same, it is also possible that only specified image subjects are extracted and only the color densities of the specified image subjects (main image subjects), that is, the densities of reproduced images are made identical, in place of the color densities of images of all the frames, by a color density correction method similar to the above method, that is, by replacing the mean exposure of the respective similar frames with the mean exposure of only the specified image subjects to thereby determine the exposure of each pixel.

It is needless to say that the image processing (color density correction processing) may be carried out so that the color densities of the images in all the similar frames and the color densities of the image subjects specified in all the specified frames are made identical.

In the printer 16, after a light-sensitive material is cut to a preset length in accordance with a print, preset information is back printed to each of the light-sensitive materials having been cut. Then, the light-sensitive material, which is being transported in an auxiliary scanning direction, is two-dimensionally scanned and exposed with three laser beams, which are supplied from the image processing apparatus 15 and modulated in accordance with image data and a latent image is formed thereon. Subsequently, the light-sensitive material is supplied to a development device, where it is subjected to preset wet development processing and dried, and then output as a print. With this operation, photographic prints, in which the color densities of images are made identical, that is, photographic prints, in which the qualities of reproduced images are made identical, can be obtained from the similar frames.

As described above in detail, according to the second aspect of the present invention, photographed image subjects recorded to respective frames are specified based on the photographing locations, camera directions and photographing magnifications thereof and the similarity of the image subjects is determined between the respective frames. Further, similarity between frames to be compared is determined depending upon the degree of similarity therebetween. Similar frames containing the same image subjects can be determined thereby with pinpoint accuracy. Accordingly, the dispersion of the color densities of the images reproduced from the same image subjects can be removed between similar frames by executing correction processing so that the color print densities of the images in the similar frames are made identical. As a result, the qualities of the reproduced images can be made identical, whereby the necessity to output photographic prints of bad quality again is reduced.

The image processing method and apparatus of the second aspect of the present invention is basically arranged as described above.

Next, a image reproducing method of a third aspect of the present invention will be described with reference to FIG. 12.

Figure 12:
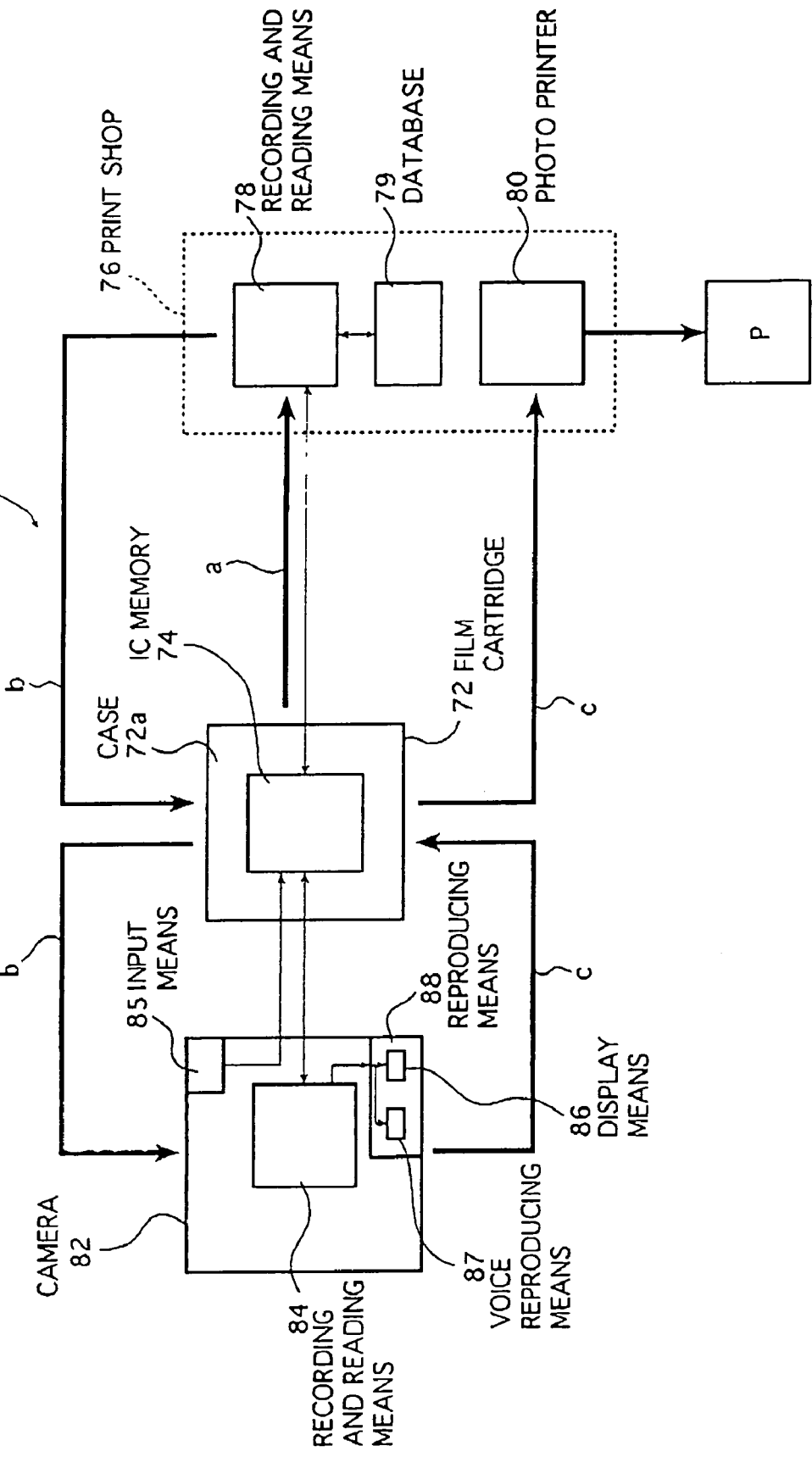
FIG. 12 is a block diagram showing the concept of an embodiment of a print system for embodying the image reproducing method of the present invention.

FIG. 12 conceptually shows a block diagram of an embodiment of a print system for embodying the image reproducing method of the third aspect of the present invention.

The illustrated print system 70 is an example in which this aspect is applied to a photographic print using a photographic film. The print system 70 uses a film cartridge (hereinafter, referred to as cartridge) 72 composed of a case 72a in which a film F is accommodated and on which a IC memory 74 is mounted. The print system 70 includes the cartridge 72, a recording and reading means 78 and a photoprinter 80, which are owned by a print shop (so-called photo lab and camera shop) 76, and a camera 82 provided with a recording and reading means 84. The recording and reading means 78 and 84 records data to and reads data from the IC memory 74. It is needless to say that the cartridge 72 may be a film cartridge FC which corresponds to the Advanced Photo System APS as shown in FIG. 3 and on which an IC memory is mounted or an ordinary film cartridge (Patrone) on which an IC is mounted. In FIG. 12, a thick solid line schematically shows the transfer of the cartridge 72 and a thin solid line schematically shows the flow of data (signal).

The recording and reading means 78 of the print shop 76 reads information recorded to the IC memory 74 of the cartridge 72 and further records necessary information to the IC memory 74.

In this aspect, before an image is recorded to the film F of the cartridge 72, the print shop 76 hears from a customer (photographer) a location, a date and time and so forth at which he or she intends to take a photograph; reads supplementary information according to them from the database 79 of the print shop 76 in response to the wish of the customer; and records the supplementary information to the IC memory 74 of the cartridge 72 through the recording and reading means 78 (refer to the arrow a in FIG. 12).

The database 79 is not limited to the one owned by the print shop 76 and a so-called center system may be employed in which supplementary information is obtained by accessing to the database of the manufacturer of the cartridge 72 through a communication means, for example, through computer communication or the like.

The information in accordance with a photographing location and photographing date and time is not particularly limited and the aforesaid various kinds of information are exemplified. It may be, for example, the photographing information shown in the first and second aspects of the present invention or may supplementary information according to the photographing information. However, it is preferable that the information can be utilized as supplementary information according to the photographing information.

For example, when the customer takes a photograph in a sight-seeing tour, it is sufficient to record information relating to the places of scenic beauty and historic interest at a tour spot such as the height of a mountain and the time when a historic building was constructed. In addition, when the customer takes a photograph in a theme park, it is sufficient to record information relating to the characters and attractions of the theme park.

Otherwise, when the customer uses the cartridge 72 in the watching of sports such as baseball, soccer and the like, it is sufficient to record the information as to the profiles and the like of players participating in the games and the information as to stadiums.

Differently, various kinds of information relating to the aforesaid photographing date and time, that is, various kinds of information as to a season, month, date and events and the like relating to them may be recorded as the supplementary information.

Further, the supplementary information may be made by adding or combining information as to a place where the customer will visit to or with a season, the moon, and events such as New Year, X'mas and the like.

The customer receives the cartridge 72 having information recorded to the IC memory 74 thereof from the print shop 76, reads out the information recorded to the IC memory 74, or loads the cartridge 72 on the camera 82 which contains the recording and reading means 84 for recording necessary information to the IC memory 74 and an input means 85 for inputting data to the IC memory 74; and takes a photograph (refer to the arrow b in FIG. 12).

As a preferable mode, the camera 82 includes, in addition to the recording and reading means 84, a reproducing means 88 which is provided with at least one of a display means 86 for displaying the information read with the recording and reading means 84 and a voice reproducing means 87 for reproducing the information as voice. Various kinds of known display means such as a liquid crystal display and the like may be used as the display means 86. The display means 86 may display characters or images (still image and/or moving image) or both of them.

Therefore, the customer can capture information according to a photographing subject by driving the recording and reading means 84, the display means 86 and the like of the camera 82, as necessary.

More specifically, according to this aspect, detailed local information can be provided in accordance with the location where the customer takes a photograph (or the vicinity of the location), whereby the tasteful property and amusement property of a camera can be greatly enhanced. Moreover, since the customer can capture the information of a photographing location and can take a photograph while capturing the information, he or she can preferably select a photographing spot and thus can remove or greatly reduce the omission of photographing.

Further, the customer selects supplementary information to be reproduced to a photographic print (hereinafter, refereed to as print) P as necessary from the supplementary information displayed on/or reproduced to the camera 82. In addition, the customer inputs a position where the supplementary information is recorded on the print P (front surface, back surface, upper position, lower position and the like) through the input means 85 of the camera 82 and stores it in the IC memory 74 of the cartridge 72.

The position may be indicated to the print shop 76 orally or through a written sheet when the customer requests the print shop 76 to print images recorded on the cartridge 72.

In this aspect, when the camera 82 is a camera containing the aforesaid GPS, photographing information such as a photographing location, for example, a longitude and latitude is also stored in the IC memory 74 as supplementary information. Then, when the customer approaches a specific point suitable to photographing, he or she may be prompted to take a photograph through the automatic display of the supplementary information on the display means 86 or through the voice automatically issued from the voice reproducing means 87.

In the mode in which the camera 82 contains the GPS, an image subject may be detected from the position and direction of the camera 82 and a photographing magnification, and the data of it may be displayed on a finder or the display means 86 or may be reproduced with the voice reproducing means 87.

On the completion of the recording of images on the film F of the cartridge 72, the customer delivers the cartridge 72 to which the images have been recorded to the print shop 76 and requests it to create the prints P through the photoprinter 80.

The photoprinter 80 photoelectrically reads an image recorded on the film F though a CCD sensor or the like and makes it to digital image data. The digital image data is subjected to image processing to thereby obtain output image data, that is, exposure conditions are obtained; a light-sensitive material (photograph paper) is scanned and exposed with recording light modulated in accordance with the thus obtained image data and the image is printed to the light-sensitive material. The photoprinter 80 is preferably the digital photoprinter 10 shown in, for example, FIG. 1, FIG. 2A, FIG. 2B, FIG. 4 and FIG. 9.

In the illustrated digital photoprinter 10, the image processing apparatus 14 including the supplementary information capture section 62 as shown in FIG. 4 or the image processing apparatus 15 including the image subject specifying section 64 and the similarity determination section 66 as shown in FIG. 9 is used. Accordingly, the digital photoprinter 10 can automatically read the supplementary information and photographing information which are recorded to the IC memory 74 of the cartridge 72 and can automatically reproduces supplementary information on the print p together with the image using the captured supplementary information and photographing information. In addition, the digital photoprinter 10 can identically finish similar frames. Thus, while the digital photoprinter 10 is preferable as the digital photoprinter 80 of the print system of this aspect, the present invention is not limited thereto and any digital photoprinter may be used so long as it can use the supplementary information and photographing information recorded to the IC memory 74 of the cartridge 72.

Further, in the print system of this aspect, the photoprinter for creating a print is not limited to the above digital photoprinter and a photoprinter, which executes ordinary direct exposure by exposing a light-sensitive material with the light projected from the film F can be also preferably used. However, a digital photoprinter such the illustrated digital photoprinter is preferable because it can back print supplementary information as well as it can easily composite it to the surface of the print P.

The digital photoprinter 10 shown in FIG. 1 is employed here as the photoprinter 80 and the description of it is omitted. The carrier 30 of the scanner 12 of the digital photoprinter 10 corresponds to the aforesaid cartridge 72 having the IC memory 74. Thus, the carrier 30 is provided with a recording and reading means (not shown) for reading supplementary information which is recorded to the IC memory 74 of the cartridge 72 and for recording necessary supplementary information to the IC memory 74.

When the cartridge 72 is mounted on the carrier 30 at a preset position of it, the not shown recording and reading means of the carrier 30 reads out information from the IC memory 74, sends necessary information to preset sections such as the image processing apparatus 14, the printer 16 and the like and records necessary information to the IC memory 74.

When a frame from which a print is created is the frame which is instructed to record the supplementary information of the aforesaid photographing location on the surface of a print, (that is, the supplementary information is recorded to the IC memory 74 of the cartridge 72), the instruction is sent from the recording and reading means of the carrier 30 to the image processing apparatus 14. In the image processing apparatus 14, supplementary information according to customer's instruction is composited to or assembled to an image to be printed. A method for compositing or assembling the supplementary information to the image is not particularly limited and any known method may be used such as a method of using an overlay memory, a method of compositing the image data of supplementary information to the image data of a print, and so forth.

The photographed image data to which the supplementary information is composited in the image processing apparatus 14 or to which the supplementary information is assembled so as to be back printed therein is sent to the printer 16. The printer 16 outputs a photographic print on which a photographed image, to which the supplementary information is composited, is reproduced or a photographic print having the supplementary information back printed to the back surface of it and a photographed image reproduced on the front surface thereof.

When a frame from which a print is created is the frame which is instructed to record supplementary information according to the place where the customer visited to the back surface of a print, the instruction is sent from the recording and reading means of the carrier 30 to the back print means of the printer 16 and the supplementary information according to the customer's instruction is also recorded to the print as back print in addition to the items which are ordinarily recorded as back print such as a frame number and the like.

As described above, since the print P has information recorded thereon such as a photographing location and photographing date and time as supplementary information in accordance with the customer's wish, it is a photographic print having a high amusement property and tasteful property as well as a high added value.

While information as to the photographing location and photographing date and time are recorded to the IC memory 74 of the cartridge 72 as the supplementary information in the above mode, the present invention is not limited thereto, and various kinds of supplementary information can be recorded to the IC memory 74.

Next, a case in which information as to a photographing subject (image subject) is supplementary information will be described as a preferable example of this aspect.

In this mode, before an image is recorded to the film F of the cartridge 72, the print shop 76 hears a photographing subject, that is, what is to be photographed (image subject) from the customer; reads out various kinds of information in accordance with the image subject from the database 79 in response to the customer's wish, and records the information of the image subject to the IC memory 74 of the cartridge 72 through the recording and reading means 78 as supplementary information.

A flower, animal, insect, building, and the like are exemplified as the image subject.

Further, one or more of the data explaining the image subject, such as the name, characteristics and the like of it, the image characteristic amount data of the image subject, the image data of the image subject, and the like are exemplified as the information according to the image subject.

Preferably, an image subject recognizing program for pattern matching and the like is also stored in the IC memory 74 in addition to the above.

Similarly to the above mode, the customer mounts the cartridge 72 having the information of the image subject recorded to the IC memory 74 thereof on the camera 82.

It is preferable in the mode that the camera 82 includes an image sensor such as a CCD sensor or the like.

When the customer directs the camera 82 toward an image subject, the image sensor of the camera 82 reads the image subject as well as the recording and reading means 84 reads out information from the IC memory 74. Thus, the camera 82 recognizes the image subject from the image data of it using the thus read out image characteristic amount, image data and the like; displays the information and the image on the display means 86 and/or reproduces the information as voice through the voice reproducing means 87.

At the time, the image subject may be recognized by means of the image subject recognizing program or may be recognized through matching between image characteristic amounts. It is also preferable to set an image subject recognizing region on the display means 86 to thereby improve recognizing accuracy.

When the customer takes a photograph, the recording and reading means 84 of the camera 82 records information for linking a frame (image) to the information of the image subject in the frame to the IC memory 74 of the cartridge 72. Further, the customer inputs an instruction for recording the information of an image subject to a print P, and further the recording position of the information in the print P and the like through the input means 85 and records them to the IC memory 74, as necessary.

That is, according to the mode, when the customer takes a photograph of an unknown image subject, for example, when the customer takes a photograph of unknown flower in a place he or she visits, he or she can take the photograph of flower after the confirmation of the name and characteristic of it. Further, the customer can record the name and the like of flower when he or she wishes it.

Therefore, according to the mode, it is possible for the customer to take a photograph while enjoying encyclopedic information, whereby the amusement property of the camera 82 can be improved and further there can be created a print P which has a high amusement property and a high added value and on which the information of an image subject such as the name and the like thereof is recorded.

Further, various kinds of amusement information are preferably recorded to the IC memory 74 of the cartridge 72 as supplementary information.

In this mode, service data such as amusement information, for example, entertainment information including music, pictures, photographs, new movies and the like, commercial information, game programs, etc. are prepared and recorded to the database 79 as a service in accordance with the total number of requests for prints of a customer.

Then, service data is recorded to the IC memory 74 of the cartridge 72 through the recording and reading means 78 in accordance with the total number of requests of the customer, and the cartridge 72 is delivered to the customer.

When the customer mounts the cartridge 72 on the camera 82, the service data recorded to the IC memory 74 is displayed on the display means 86; the service data is reproduced as voice through the voice reproducing means 87; or it is possible to enjoy a game using the display means 86 and the voice reproducing means 87.

Further, the information recorded to the IC memory 74 may be fed back making use of the data recorded to the IC memory 74, when the cartridge 72 is presented next time.

For example, the advancing state of a presented game is recorded to the IC memory 74 and a succeeding portion of the game may be recorded to the IC memory 74 next time. Otherwise, a request for purchase may recorded in accordance with presented commercial information and a commodity may be delivered next time.

According to this mode, since a service of higher quality can be presented to the customer in accordance with the number of requests for the creation of prints of the customer, the request for prints can be increased and the sales promotion of the cartridge 72 can be carried out.

Further, since the customer can enjoy the camera 82 at a tour spot during an idle time, the use of the camera 82 is expanded and the amusement property of it can be greatly enhanced.

Scenes photographed by the customer in the past are preferably exemplified as supplementary information to be recorded to the IC memory 74 of the cartridge 72.

Also in this aspect, before an image is recorded on the film F of the cartridge 72, the print shop 76 reads out the information of a scene photographed by the customer in the past from the database 79 and records it to the IC memory 74 of the cartridge 72 as supplementary information using the recording and reading means 78.

Exemplified as the information of the scenes are a photographed image itself, a reduced one of the photographed image, classification of photographed scenes, (persons, flower, scenes, and classification numbers classified by the customer, etc.), comments relating to scenes, information of the camera used in photographing, and the like.

Similarly to the above aspect, the customer mounts the cartridge 72 having the past photographing information recorded to the IC memory 74 thereof as supplementary information on camera 82; reads the past photographing information recorded to the IC memory 74 through the recording and reading means 84 in photographing when necessary; and displays it on the display means 86 or reproduces it through the voice reproducing means 87 as voice.

That is, according to the mode, since the customer can take a photograph while confirming a scene (image) photographed in the past, it can be prevented to take the photograph of the same scene or a similar scene or to omit photographing. Further, when it was failed to take a photograph of an image, it is possible to photograph the image while referring to the failed image.

Further, an image photographed in the past may be composited to a newly photographed image according to the taste of the customer and the composite image may be displayed on the display means 86 or may be output as a print.

In the print system of this mode, various kinds of external information can be recorded to the IC memory 74 of the cartridge 72 and displayed on the display means 86 or the like or can be printed by the photoprinter 80 as supplementary information, in addition to the aforesaid various kinds of information.

When, for example, information relating to characters and attractions are presented in an amusement park and theme park through a radio wave or infrared rays, the camera 82 may receive the information; record it to the IC memory 74 of the cartridge 72 through the recording and reading means 84; and display it on the display means 86, reproduce it through the voice reproducing means 87 or record it as a print P through the printer 80.

Further, when the camera 82 has the above GPS function, the moving path of the camera 82 may be recorded to the IC memory 74 and composited to a map in the print shop 76 so that a print indicating the moving path of the camera 82 is created.

In addition to the above-mentioned, the camera 82 may receive facsimile signals, record them to the IC memory 74 and output the information obtained from the signals as a print P. Further, the camera 82 may record specific scenes of a digital camera, TV and VTR, image data of a personal computer, and documents and image data of the personal computer, word processor and PDA (portable data adapter) to the IC memory 74 and output them as a print P. Furthermore, the camera 82 may receive audio data and output it as a print P likewise.

That is, according to this mode, various kinds of information other than a photographed image can be output as a print P in addition to the creation of an ordinary print, whereby the use of the camera 82 and a photograph can be greatly expanded.

In this aspect, it is needless to say that these various kinds of information may be composited to a photographed image. Further, a header may be added to supplementary information depending upon the kinds of information.

The above examples show that the print system of this aspect is used to create a photographic print by means of the cartridge 72 including the IC memory 74 (film). However, the print system of this aspect can be preferably used to the print of an image which is photographed using a camera (photographing device) such as a digital video camera, digital video camera and so forth, in addition to the above photographic print.

In this example, a storage medium for recording the image data of an image photographed with the photographing device such as the digital camera and the like is divided into an image data storing region and a supplementary information storing region, which is used similarly to the IC memory 74.

Information may be added to the image data storing region of the storage medium and to the supplementary information storing region thereof to permit the photographing device such as the digital camera and so forth and the recording and reading means 78 of the print shop 76 to recognize the addresses of the respective regions. Otherwise, the storing medium may be fixedly provided with information for recognizing the addresses of the respective regions.

The storing medium is not particularly specified and various kinds of known storing mediums, that is, a magnetic recording medium such as a floppy disc, a removable hard disc including a Zip, jaz, etc., a magneto-optic recording medium such as a MD (mini disc), MO and the like, a card memory such as an IC card, smart media and so forth can be used.

As described above in detail, according to the third aspect of the present invention, the tasteful property, amusement property and use of a camera can be expanded as well as a print of high quality which has the tasteful property and amusement property of high level and a high added value and to which various kinds of information are added can be created, whereby the use of a print can be also greatly expanded.

The image reproducing method of the third aspect of the present invention is basically arranged as described above.

Next, a photographing support system of a fourth aspect of the present invention will be described with reference to FIG. 13.

Figure 13:
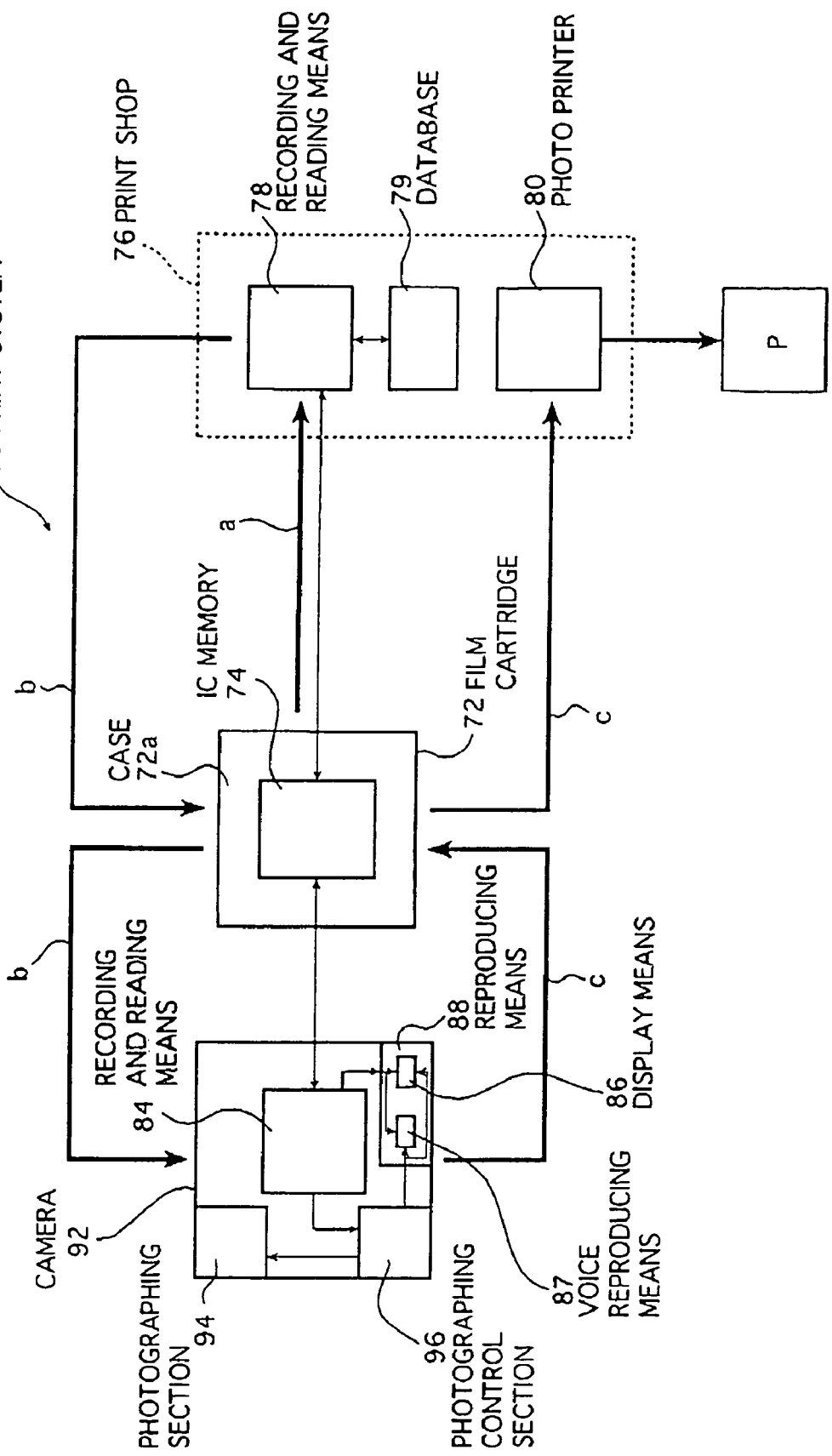
FIG. 13 is a block diagram showing the concept of a print system making use of a photographing support system of the present invention.

FIG. 13 conceptually shows a block diagram of an embodiment of a print system making use of the photographing support system of the present invention.

The print system 90 shown in FIG. 13 has the same arrangement as the print system 70 of the third aspect shown in FIG. 12 except that the latter print system includes the camera 82 provided with the input means 85, whereas the former print system includes a camera 92 provided with a photographing section 94 and a photographing control section 96. Accordingly, the same numerals as used in the print system 70 are used in the print system 90 to denote the same components and the detailed description of it is omitted.

The print system 90 of the illustrated example includes a film cartridge 72 composed of a case 72a in which a film F is accommodated and on which a IC memory 74 is mounted, a recording and reading means 78 for recording data to and reading data from the IC memory 74 which is owned by a print shop 76, and the camera 92 having a recording and reading means 84 for recording data to and reading data from the IC memory 74. In the figure, numeral 80 denotes a photoprinter 80 owned by the print shop 76.

The recording and reading means 78 of the print shop 76 reads necessary information from a database 79 and records it to the IC memory 74 of the cartridge 72 and reads information recorded to the IC memory 74 of the cartridge 72 and supplies necessary information to the database 79.

The IC memory 74 records various kinds of information. In this aspect, however, the IC memory 74 records various kind of photographing information, for example, a photographing magnification, focal length, photographing luminance, and the like each time an image is photographed to each frame of the cartridge 72 (film). When it is requested to create a print from the cartridge 72, the photographing information is read with the recording and reading means 78 and stored and accumulated in the database 79 for each customer.

Further, the information of the image correction instruction issued from a customer when he or she requested a reprint (creation of a reprint) in the past, in particular, the information of the instruction relating to the correction of image density is also recorded and accumulated in the database 79 for each customer. That is, the taste of each customer is accumulated and recorded in the database 79.

The photographing information and the correction information (information of the customer's taste) are analyzed in the database 79 and photographing support conditions are set and stored in the database 79 so that an image can be photographed in accordance with the taste of each customer.

For example, a tendency of a customer for image correction of is analyzed on a two-dimensional space represented by photographing magnification data and luminance (which is preferably divided into luminance of each area) of each customer. Then, a program for correcting and controlling the camera 92, for example, a program for controlling a stop value and shutter speed in photographing, that is, a program for executing automatic exposure control (hereinafter, abbreviated as AE) is set to each customer according to the analyzed tendency and stored in the database 79. This program is provided so that photographing is carried out under optimum photographing conditions to obtain an image satisfying the state of a customer depending upon various conditions such as weather, a photographing location (indoor and outdoor), whether an electronic flash is used or not, and the like.

It should be noted that a correction program or correcting conditions may be set in place of the control program in order to correct a control program of the AE and the like which are set to the camera 92 as default.

Further, the analysis and the setting of the photographing support conditions may be carried out for each of classified scenes.

In this aspect, before an image is photographed to the film of the cartridge 72, photographing support conditions according to a customer are read from the database 79 and recorded to the IC memory 74 of the cartridge 72 through the recording and reading means 78 as photographing support information when a customer wishes it, (refer to the arrow a in FIG. 13).

The database 79 is limited to the one owned by the print shop 76 and a so-called center system may be employed in which information is obtained by accessing to the database of the manufacture of the cartridge 72 through computer communication or the like.

The customer receives the cartridge 72 having the photographing support information recorded to the IC memory 74 thereof from the print shop 76 and mounts it on the camera 92 (refer to the arrow b in FIG. 13).

The camera 92 includes a recording and reading means 84, a photographing control section 96 and a reproducing means 88, in addition to the photographing section 94 for photographing an image to the film accommodated in the cartridge 72. The recording and reading means 84 reads information recorded to the IC memory 74 and recording necessary information to the IC memory 74. The photographing control section 96 controls the photographing section 94. The reproducing means 88 reproduces various kinds of information as voice and/or display.

When the switch of the camera 92 is turned on, the recording and reading means 84 reads various kind of information recorded to the IC memory 74 and supplies photographing support information to the photographing control section 96. The photographing control section 96 comprises, for example, a CPU and the like, sets the supplied photographing support information, for example, the above AE control program and controls the operation of the photographing section 94 such as the stop value, shutter speed and the like using the control program. Otherwise, the photographing control section 96 reproduces the optimum photographing conditions by the reproducing means 88 and notifies them to a photographer.

Further, when photographing carried out, photographing information such as the photographing length, luminance and the like of a frame is recorded to the IC memory 74 through the recording and reading means 84.

Therefore, according to this aspect, even if photographing is carried out in an AE mode or in a manual mode, a camera control characteristic, which reflects the taste of a customer, can be realized, and a print, on which an image according to the taste of the customer is reproduced, can be created in correspondence to each customer.

In particular, it is possible to more preferably reflect the taste of the customer by setting the photographing support conditions for each classified scene.

The cartridge 72 to which images have been photographed is delivered to the print shop 76, the film is developed by the photoprinter 80, the negative images on the film are printed to a light-sensitive material (photograph paper), the light-sensitive material is developed and output as a print on which photographed images are reproduced.

The photographing information of each frame, which is recorded to the IC memory 74 of the cartridge 72, is read by the recording and reading means 78 and recorded and accumulated in the database 79. The photographing information and the correction information are analyzed again as necessary and new photographing support conditions are set.

In the above example, the camera 92 carries out any one of the automatic control of the photographing section 94 through the photographing control section 96 and the reproduction of the photographing conditions through the reproducing means 88. However, the present invention is not limited thereto and the camera 92 may carry out both of them. Further, the camera 92 is not limited to the camera including both of the photographing control section 96 and the reproducing means 88.

The reproducing means 88 may be provided with a display means 86 such as a liquid crystal display or the like for displaying images and characters, with a voice reproducing means 87 for reproducing information in voice or with both of them also in this mode.

In the above mode, the photographing support information corresponding to the taste of each customer is recorded to the IC memory 74 of the cartridge 72. However, the present invention is not limited thereto and the support information relating a photographing scene may be recorded to the IC memory 74 and the control and the like of the photographing section 94 may be carried out thereby.

In this aspect, various kinds of photographing scenes are classified beforehand and photographing support conditions are set in accordance with each of the classified scenes and stored in the database 79.

A person, flower, landscape, night view, astronomical object, monitoring and the like are exemplified as the items for classifying the photographing scenes. The AE program, an automatic focus adjustment (hereinafter, abbreviated as AF) program, photographing advice information and the like are exemplified as the photographing support conditions according to the classified photographing scenes.

It should be noted that the photographing support conditions in this aspect are not particularly limited. For example, when a classified photographing scene is in a night view mode, a condition for increasing an exposure time is exemplified so that an image having a vivid highlight and shadow can be obtained; when it is in a landscaped mode, a condition for increasing a stop value so as to widen the depth of an image subject is exemplified so that a tight focused scene can be obtained from a near point to a far point; when it is in a flower mode, a condition opposite to the landscape mode is exemplified; when it is in a person mode and a camera is provided with a CCD sensor, a condition for executing face extraction algorithm is exemplified so that a face region can be optimally exposed and an electronic flash can be operated in a controlled state, respectively.

In this aspect, before a scene as an image subject is photographed to the film of the cartridge 72, the print shop 76 hears to a customer that what scene he or she wishes to photograph. When the customer wishes to take a photograph of a particular scene, the print shop 76 reads the photographing support conditions corresponding to the classification of the particular scene from the database 79 and records the conditions to the IC memory 74 of the cartridge 72 through recording and reading means 78 as photographing support information.

Similarly to the previous aspect, the customer mounts the cartridge 72 having the IC memory 74 to which the photographing support information is recorded on the camera 92.

When the switch of the camera 92 is turned on, the recording and reading means 84 reads various kinds of information stored in the IC memory 74 and supplies photographing support information, for example, an AE program and an AF program according to the classification of the above photographing scene to the photographing control section 96. The photographing control section 96 sets the supplied photographing support conditions and controls the operation of the photographing section 94 in accordance with the photographing support conditions.

Otherwise, when photographing is carried out in a manual mode in which the AE control and the AF control is not carried out, the photographing control section 96 reproduces a photographing advice information and warning in accordance with photographing luminance and a length to an image subject through the reproducing means 88 and notifies a photographer of it.

Therefore, according to this aspect, an optimum photographing technique can be provided for each of the classified scenes and photographing can be carried out under a latest AE control and AF control.

In this aspect, the photographing support conditions such as the AE program, the AF program and the like may be edited and recorded by the customer.

In addition, both of the AE and AF controls and the reproduction of the photographing advice information and the like through the reproducing means 88 may be carried out.

It should be noted that the photographing support information, which is recorded to the IC memory 74 of the cartridge 72 in accordance with the classified scene, is not limited one kind of information. However, it is also possible to record a plurality of kinds of information to the IC memory 74 in accordance with a plurality of classified scenes so that the photographer can select photographing support information according to a particular photographing scene and control photographing thereby.

At the time, the camera 92 may be provided with an image sensor such as a CCD sensor or the like, a photographing scene may be read with the image sensor in photographing and automatically classified, and photographing support information according to the thus read photographing scene may be automatically selected to thereby control the photographing and reproduce an advice for the photographing.

In the above example, the print system of this aspect is applied to the creation a print (photographic print) which is executed using the (film) cartridge 72 having the IC memory 74. However, the print system of this aspect can be preferably used, in addition to the above, in a print of an image which is photographed using a camera (photographing device) such as a digital camera, a digital video camera and so forth.

In this example, a storage medium for recording the image data of an image photographed with the photographing device such as the digital camera and the like is divided into an image data storing region and an information storing region, which is used similarly to the IC memory 74.

Information may be added to the image data storing region of the storage medium and to the information storing region thereof to permit the photographing device such as the digital camera and so forth and the recording and reading means 78 of the print shop 76 to recognize the addresses of the respective regions. Otherwise, the storing medium may be fixedly provided with information for recognizing the addresses of the respective regions.

The storing medium is not particularly specified and various kinds of known storing mediums, that is, a magnetic recording medium such as a floppy disc, a removable hard disc including a Zip, jaz, etc., a magneto-optic recording medium such as a MD (mini disc), MO and the like, a card memory such as an IC card, smart media and so forth can be used.

As described above in detail, according to the present invention, the photographing support conditions can be set in accordance with the taste of a customer and a photographing scene and photographing can be carried out under optimum conditions. Accordingly, a print, on which a preferable image is reproduced in accordance with the taste of the customer and the photographing scene, can be stably created.

The image reproducing method and the image reproducing apparatus of the present invention, the image processing method and apparatus of the present invention used to them as well as the photographing support system of the present invention have been described in detail with reference to the various embodiment. However, the present invention is by no means limited to the above embodiments and it goes without saying that various improvements and design modifications can be made within the range which does not depart from the gist of the invention.

What is claimed is:

1. An image reproducing method for acquiring digital image data of a photographed image of a subject, obtaining output image data by subjecting the digital image data to preset image processing and outputting a visible image reproducing the photographed image based on the output image data, comprising the steps of:
  capturing photographing information in association with the photographed image;
  capturing supplementary information relating to at least a part of the captured photographing information; and
  reproducing and adding the captured supplementary information to the photographed image;
  wherein the supplementary information is related supplementary information which is searched and selected from the supplementary information previously stored in a database using at least part of the captured photographing information.

2. The image reproducing method according to claim 1, wherein the digital image data is a digital image data obtained by photoelectrically reading the photographed image photographing the subject on a photographic film or a digital image data of the photographed image obtained directly by photographing the subject.

3. The image reproducing method according to claim 1, wherein the step of outputting the visible image is at least one of the steps of outputting a photographic print and displaying onto display means and the step of display on the display means is at least one of the steps of displaying on a monitor and projecting by a projector.

4. The image reproducing method according to claim 1, wherein the supplementary information is an information with respect to the subject of the photographed image or a photographing situation of the photographed image.

5. The image reproducing method according to claim 1, wherein the supplementary information is at least one of character data, document data, audio data, still picture data and motion-picture data.

6. The image reproducing method according to claim 1, wherein, in case of at least one of outputting the visible image on a photographic print and displaying the visible image on a display means, the supplementary information is composited to at least one of the visible image on the photographic print and the displayed visible image on the display means, outputting to a back surface of the photographic print by a back printer, exposed and printed to the back surface thereof, displayed as at least one of characters, documents, still pictures and motion-pictures linking to the visible image displayed on the display means or output in voice linking to the visible image displayed on the display means.

7. The image reproducing method according to claim 1, wherein at least one of the photographing information and the supplementary information is recorded to a magnetic recording layer of a photographic film which corresponds to a photographing frame of the photographic film to which the photographed image is photographed, recorded optically on the photographic film in accordance with the photographing frame, stored in an IC memory of a photographic film cartridge provided with it in accordance with the photographing frame, recorded into image recording medium on which the digital image data of the photographed image is recorded in accordance with the photographing frame, recorded on a data recording medium in accordance with the photographing frame of the photographic film or the digital image data, recorded in a database in accordance with the photographing frame of the photographic film or the digital image data, and/or recorded on a designated recording ware via networks in accordance with the photographing frame of the photographic film or the digital image data, said at least one of the photographing information or the supplementary information is read out from at least one of the magnetic recording layer, the recording optically on the photographic film, the IC memory, the image recording medium, the data recording medium, the database and the designated recording ware when the image of said photographing frame is reproduced as the visible image, and the supplementary information captured from the read-out photographing information or the read-out supplementary information is output by being added to a photographed image of said photographing frame.

8. The image reproducing method according to claim 1, wherein, in case of outputting at least one of the visible image on a photographic print and a display screen on the display means, at least one of the photographing information and the supplementary information is optically exposed and printed to a photographing frame of the photographic film to which the image is photographed before the photographic film is developed, when the image of the photographing frame is simultaneously printed or reprinted after the photographic film is developed, the photographing information or the supplementary information, which is optically exposed and printed, is read from the image frame of the photographing frame of the photographic film to which the photographing information or the supplementary information is printed, and supplementary information captured from the read photographing information is reproduced by being added to the photographic print or the display screen, or the read supplementary information is reproduced, as it is or after it is processed, by being added to the photographic print or the display screen.

9. The image reproducing method according to claim 1, wherein the photographing information is at least a part of a photographing date and time data which is captured in association with the photographed image.

10. The image reproducing method according to claim 9, wherein the photographing date and time data is data representing at least one of the photographing date and the photographing time of the photographed image or a part of them, and the supplementary information is relating supplementary information which is searched and selected from the supplementary information stored in a database beforehand using at least one of the year, month, date and time of the photographing date and time data as a searching basis.

11. The image reproducing method according to claim 10, wherein the supplementary information is searched and selected based on user designated data in addition to the photographing date and time data.

12. The image reproducing method according to claim 9, wherein the photographing information is at least one of a first data composition containing a photographing location, a second data composition containing the photographing location and a photographing direction, a third data composition containing the photographing location and a photographing magnification and a fourth data composition containing the photographing location, the photographing direction and the photographing magnification, which are captured in association with the photographed image in addition to the photographing date and time data.

13. The image reproducing method according to claim 1, wherein the photographing information is at least one of a first data composition containing a photographing location, a second data composition containing the photographing location and a photographing direction, a third data composition containing the photographing location and a photographing magnification and a fourth data composition containing the photographing location, the photographing direction and the photographing magnification, which are captured in association with the photographed image.

14. The image reproducing method according to claim 13, wherein the photographing information includes an information of the photographing location which is captured by a position measuring device using a satellite.

15. The image reproducing method according to claim 13, wherein the supplementary information is an information as to the photographed subject, a photographic point or both, which is specified from the supplementary information previously stored in a database based on the photographing information of at least one of the first, the second, the third and the fourth data compositions or based on at least one of this photographing information and a map information.

16. The image reproducing method according to claim 15, wherein said at least one of the photographed subject and the photographic point is specified by a pattern matching between the photographed image and a three-dimensional image, which is created based on the photographing information of said at least one of the first, the second, the third and the fourth data compositions and based on the map information.

17. The image reproducing method according to claim 13, wherein the supplementary information is at least one of character data, document data, audio data, still picture data and motion-picture data as to the photographed subject.

18. The image reproducing method according to claim 13, wherein, in case of at least one of outputting the visible image on a photographic print and displaying the visible image on a display means, the supplementary information is added to at least one of the photographic print and a displayed image on the display means by compositing a three-dimensional computer graphic image to the photographed image or by compositing an image arranged as a database to the photographed image and by outputting the photographic print and/or by displaying on the display means, wherein the three-dimensional computer graphic image is created based on said photographing information and on a map information and whose pattern is matched with the subject of the photographed image, and the image arranged as the database is selected from a plurality of images, which are photographed beforehand and arranged as a database, as an image, whose photographing location and photographing direction are nearest to the photographing location and the photographing direction, and is corrected in accordance with the composition of the photographed image and the size of the subject.

19. An image reproducing apparatus including image input means for acquiring digital image data of a photographed image of a subject, image processing means for obtaining output image data by subjecting the digital image data obtained by the image input means to preset image processing, and image output means for outputting a photographed image as a visible image based on the output image data which is output from the image processing means, comprising:

photographing information capture means for capturing photographing information in association with the photographed image;

supplementary information capture means for capturing supplementary information relating to at least a part of the photographing information captured by said photographing information capture means; and supplementary information output means for adding the supplementary information captured by said supplementary information capture means to the photographed image reproduced as the visible image;

wherein said supplementary information capture means comprises a database in which the supplementary information is stored and supplementary information selection means for searching the database using at least part of the photographing information captured by said photographing information capture means and for selecting the supplementary information related to the at least part of the photographing information from the supplementary information previously stored in the database.

20. The image reproducing apparatus according to claim 19, wherein the image input means reads photoelectrically the digital image data from the photographed image photographing the subject on a photographic film or obtains directly a digital image data of the photographed image by photographing the subject.

21. The image reproducing apparatus according to claim 19, wherein the image output means is at least one of image recording means for outputting a photographic print in which the visible image is reproduced and display means for reproducing and displaying the visible image and the display means is at least one of a monitor for displaying the visible image and a projector for projecting the visible image.

22. The image reproducing apparatus according to claim 19, wherein the supplementary information is an information with respect to the subject of the photographed image or a photographing situation of the photographed image.

23. The image reproducing apparatus according to claim 19, wherein said photographing information capture means captures at least a part of photographing date and time data in association with the photographed image as the photographing information.

24. The image reproducing apparatus according to claim 23, wherein said photographing information capture means captures at least a part of the photographing date and photographing time of the image as the photographing date and time data, and said supplementary information capture means comprises a database in which the supplementary information is stored and supplementary information selection means for searching the database using at least a part of the photographing date and time data and for selecting the supplementary information relating to at least a part of the photographing date and time data from the supplementary information stored in the database beforehand.

25. The image reproducing apparatus according to claim 24, wherein said supplementary information selection means searches the database and selects the supplementary information based on user designated data in addition to at least a part of the photographing date and time data.

26. The image reproducing apparatus according to claim 23, wherein said photographing information capture means further captures at least one of a first data composition containing a photographing location, a second data composition containing the photographing location and a photographing direction, a third data composition containing the photographing location and a photographing magnification and a fourth data composition containing the photographing location, the photographing direction and the photographing magnification, which are captured in association with the photographed image in addition to the photographing date and time data.

27. The image reproducing apparatus according to claim 19, wherein said photographing information capture means captures at least one of a first data composition containing a photographing location, a second data composition containing the photographing location and a photographing direction, a third data composition containing the photographing location and a photographing magnification and a fourth data composition containing the photographing location, the photographing direction and the photographing magnification, which are captured in association with the photographed image.

28. The image reproducing apparatus according to claim 27, wherein said photographing information capture means captures the photographing information including the information of the photographing location which is captured by a position measuring device using a satellite.

29. The image reproducing apparatus according to claim 27, wherein said supplementary information capture means comprises
a database for storing the supplementary information as to at least one of the subject and a photographic point, and
supplementary information selection means which selects and captures from the database the supplementary information as to at least one of the photographed subject and the photographic point, which is specified based on the photographing information of one of the first data composition to the fourth data composition or based on this photographing information and a map information.

30. The image reproducing apparatus according to claim 19, wherein said image output means is at least one of image recording means for outputting a photographic print in which the subject is reproduced and display means for reproducing and displaying the visible image, and wherein said supplementary information output means is at least one of image composite means for extending the supplementary information to digital image information and for compositing the digital image information to the digital image data which is subjected to image processing by said image processing means, outputting means for outputting the supplementary information to the back surface of the photographic print through a back printer, exposing and printing means for exposing and printing the supplementary information to the back surface of the photographic print, linking means for linking the supplemental information to the visible image on the display means to display the supplemental information as at least one of characters, documents, still pictures and motion-pictures on the display means and audio outputting means for outputting the supplemental information in voice to link it to the visible image on the display means.

31. An image reproducing method for acquiring digital image data of a photographed image of a subject, obtaining output image data by subjecting the digital image data to preset image processing and outputting a visible image reproducing the photographed image based on the output image data, comprising the steps of:
capturing photographing information in association with the photographed image;
capturing supplementary information relating to at least a part of the captured photographing information; and
reproducing and adding the captured supplementary information to the photographed image;
wherein the photographing information is at least a part of a photographing date and time data which is captured in association with the photographed image; and
wherein the photographing date and time data is data representing at least one of the photographing date and the photographing time of the photographed image or a part of them, and the supplementary information is relating supplementary information which is searched and selected from the supplementary information stored in a database beforehand using at least one of the year, month, date and time of the photographing date and time data as a searching basis.

32. The image reproducing method according to claim 31, wherein the supplementary information is searched and selected based on user designated data in addition to the photographing date and time data.

33. An image reproducing apparatus including image input means for acquiring digital image data of a photographed image of a subject, image processing means for obtaining output image data by subjecting the digital image data obtained by the image input means to preset image processing, and image output means for outputting a photographed image as a visible image based on the output image data which is output from the image processing means, comprising:
photographing information capture means for capturing photographing information in association with the photographed image;
supplementary information capture means for capturing supplementary information relating to at least a part of the photographing information captured by said photographing information capture means; and
supplementary information output means for adding the supplementary information captured by said supplementary information capture means to the photographed image reproduced as the visible image;
wherein said photographing information capture means captures at least a part of photographing date and time data in association with the photographed image as the photographing information; and
wherein said photographing information capture means captures at least a part of the photographing date and photographing time of the image as the photographing date and time data, and said supplementary information capture means comprises a database in which the supplementary information is stored and supplementary information selection means for searching the database using at least a part of the photographing date and time data and for selecting the supplementary information relating to at least a part of the photographing date and time data from the supplementary information stored in the database beforehand.

34. The image reproducing apparatus according to claim 33, wherein said supplementary information selection means searches the database and selects the supplementary information based on user designated data in addition to at least a part of the photographing date and time data.

35. An image reproducing method for obtaining the digital image data of the image of a photographing frame, to which an image subject is photographed, of an image recording medium, obtaining output image data by subjecting the obtained digital image data to preset image processing and outputting at least one of a photographic print and a displayed image based on the output image data, comprising the steps of:

capturing photographing information in association with the image of the photographing frame;
   capturing supplementary information relating to at least a part of the captured photographing information; and
   adding the captured supplementary information to at least one of the photographic print and the displayed image;
   wherein the supplementary information is related supplementary information which is searched and selected from the supplementary information previously stored in a database using at least part of the captured photographing information.

36. The image reproducing method according to claim 35, wherein the image recording medium is a photographic film, and the digital image data is obtained by photoelectrically reading the image of a photographing frame photographed to the photograph film.

37. The image reproducing method according to claim 35, wherein the image recording medium is a digital recording medium, and the digital image data is directly recorded to the digital data recording medium by being photographed with a digital photographing device and then read from the digital data recording medium.

38. The image reproducing method according to claim 35, further comprising the steps of:

determining the similarity between respective photographing frames based on the photographing information; and
   subjecting the image data of a plurality of similar frames which are determined to have similarity to similar image processing so that the qualities of the images reproduced from a plurality of the similar frames are made identical.

39. The image reproducing method according to claim 35, wherein an image recording medium having a photographing image recording region and a supplementary information recording region is further used as the image recording medium, and when supplementary information is recorded to the supplementary information recording region, the supplementary information is reproduced with a camera on which the image recording medium is mounted and the image recorded to the photographing image recording region is output, the supplementary information recorded to the supplementary information recording region is automatically or selectively recorded to at least one of the front surface and the back surface of a photographic print, a displayed image output on display means or both.

40. The image reproducing method according to claim 35, wherein an image recording medium having a photographing image recording region and a supplementary information recording region is further used as the image recording medium, and a photographing support method is executed when an image subject is photographed, the photographing support method comprising the steps of:

recording photographing support information to the supplementary information recording region before an image is photographed to the photographed image recording region;
   reading the photographing support information from the supplementary information recording region with information reading means mounted on a camera in photographing; and
   executing at least one of the control of the photographing operation carried out by the camera and the reproduction of the photographing support information in accordance with the read photographing support information.

41. An image reproducing apparatus including image input means for obtaining the digital image data of the image of a photographing frame, to which an image subject is photographed, of an image recording medium, image processing means for obtaining output image data by subjecting the digital image data obtained by the image input means to preset image processing, and image outputting means for outputting at least one of a photographic print and a displayed image based on the output image data which is output from the image processing means, comprising:

photographing information capture means for capturing photographing information in association with the image of the photographing frame;
   supplementary information capture means for capturing supplementary information relating to at least a part of the photographing information captured by said photographing information capture means; and
   supplementary information output means for adding the supplementary information captured by said supplementary information capture means to at least one of the photographic print and the displayed image;
   wherein said supplementary information capture means comprises a database in which the supplementary information is stored and supplementary information selection means for searching the database using at least part of the photographing information captured by said photographing information capture means and for selecting the supplementary information related to the at least part of the photographing information from the supplementary information previously stored in the database.

42. The image reproducing apparatus according to claim 41, wherein the image recording medium is a photograph film, and said image input means obtains the digital image data by photoelectrically reading the image of the frame photographed to the photograph film.

43. The image reproducing apparatus according to claim 41, wherein the image recording medium is a digital recording medium, and said image input means obtains the digital image data, which is directly recorded to the digital data recording medium by being photographed with a digital photographing device, by reading it from the digital data recording medium.

44. The image reproducing apparatus according to claim 41, further comprising similarity determination means for determining the similarity between a plurality of the photographing frames based on the photographing information captured by said photographing information capture means, wherein said image processing means subjects the digital image data of a plurality of the similar frames which are determined to have similarity by said similarity determination means to similar image processing so that the qualities of the images reproduced from a plurality of the similar frames are made identical.

45. An image reproducing method for obtaining the digital image data of the image of a photographing frame, to which an image subject is photographed, of an image recording medium, obtaining output image data by subjecting the obtained digital image data to preset image processing and outputting at least one of a photographic print and a displayed image based on the output image data, comprising the steps of:

capturing photographing information in association with the image of the photographing frame;

capturing supplementary information relating to at least a part of the captured photographing information; and adding the captured supplementary information to at least one of the photographic print and the displayed image;

wherein the photographing information is at least a part of a photographing date and time data which is captured in association with the photographed image; and wherein the photographing date and time data is data representing at least one of the photographing date and the photographing time of the photographed image or a part of them, and the supplementary information is relating supplementary information which is searched and selected from the supplementary information stored in a database beforehand using at least one of the year, month, date and time of the photographing date and time data as a searching basis.

46. An image reproducing apparatus including image input means for obtaining the digital image data of the image of a photographing frame, to which an image subject is photographed, of an image recording medium, image processing means for obtaining output image data by subjecting the digital image data obtained by the image input means to preset image processing, and image outputting means for outputting at least one of a photographic print and a displayed image based on the output image data which is output from the image processing means, comprising:

photographing information capture means for capturing photographing information in association with the image of the photographing frame;

supplementary information capture means for capturing supplementary information relating to at least a part of the photographing information captured by said photographing information capture means; and supplementary information output means for adding the supplementary information captured by said supplementary information capture means to at least one of the photographic print and the displayed image;

wherein said photographing information capture means captures at least a part of photographing date and time data in association with the photographed image as the photographing information; and wherein said photographing information capture means captures at least a part of the photographing date and photographing time of the image as the photographing date and time data, and said supplementary information capture means comprises a database in which the supplementary information is stored and supplementary information selection means for searching the database using at least a part of the photographing date and time data and for selecting the supplementary information relating to at least a part of the photographing date and time data from the supplementary information stored in the database beforehand.

47. A photographed image similarity determining method for obtaining the image data of a plurality of photographing frames which are photographed with a camera and for determining similarity between images of the plurality of photographing frames, comprising the steps of:

reading respective photographing information in association with the images of the respective photographing frames; and determining similarity between the respective photographing frames based on the read photographing information;

wherein the photographing information is at least one of a photographing location and a photographing direction of the camera which are associated with each image of the plurality of photographing frames.

48. An image processing method for obtaining image data of a plurality of photographing frames which are photographed with a camera and for obtaining output image data to be output as a visible reproduced image by subjecting the image data to preset image processing, comprising the steps of:

reading respective photographing information in association with images of respective photographing frames;

determining similarity between the respective photographing frames based on the read photographing information; and subjecting the image data of a plurality of similar frames which are determined to have the similarity to similar image processing so that qualities of the images reproduced from the plurality of similar frames are made identical;

wherein the photographing information is at least one of a photographing location associated with the image of the photographing frame and a photographing direction of the camera associated therewith.

49. The image processing method according to claim 48, wherein the photographing information further includes at least one of a photographing magnification and a photographing date and time associated with the image of the photographing frame.

50. The image processing method according to claim 48, wherein the photographing location is information which is captured by a position measuring device using a satellite.

51. The image processing method according to claim 48, wherein the similarity is determined by specifying photographed image subjects using the read photographing information and by determining whether common specified image subjects exist or not.

52. The image processing method according to claim 51, wherein the similar image processing includes processing for making the exposures of the common specified image subjects identical so that the densities of the reproduced images of the common specified image subjects in the images of the plurality of similar frames, which are determined similar by the determination of the similarity of them, are made identical.

53. The image processing method according to claim 48, wherein the similarity is determined by determining a degree of similarity between photographing frames as to the read photographing information and by comparing the determined degree of similarity with a preset threshold value.

54. The image processing method according to claim 53, wherein the degree of similarity between the photographing frames is represented by the weighed mean value of the absolute values of the differences determined between the respective ones of the read photographing information or by the weighed mean value of the squares of the respective differences.

55. The image processing method according to claim 48, wherein the similar image processing is processing for determining the exposure of all the frames for the plurality of the similar frames, determining the mean value or the weighted mean value of the determined exposure of the respective similar frames and setting the exposure of each similar frame to the mean value or to the weighed mean value so that the images reproduced from the plurality of the similar frames are made identical.

56. The image processing method according to claim 48, wherein the images of the plurality of similar frames similar are surrounded with enclosures for identifying the similar frames when they are displayed.

57. An image processing apparatus for obtaining image data of a plurality of photographing frames which are photographed with a camera and for obtaining output image data to be output as a visible reproduced image by subjecting the image data to preset image processing, comprising:
photographing information capture means for capturing at least one photographing information of a photographing location and a camera direction in association with the each image of the plurality of photographing frames;
similarity determination means for determining similarity between the plurality of photographing frames based on the photographing information captured by said photographing information capture means; and
image processing means for subjecting the image data of a plurality of similar frames which are determined to have similarity by said similarity determination means so that qualities of the images reproduced from the plurality of similar frames are made identical.

58. A print method, comprising the steps of:
recording supplementary information as recordable and readable data to a supplementary information recording region before a recording medium having a photographing image recording region and the supplementary information recording region is mounted on a camera;
thereafter, photographing a subject with the camera on which the recording medium has been mounted to record an image of the subject to the photographing image recording region of the recording medium; and
when the image of the subject recorded to the photographing image recording region of the recording medium is printed;
reading the supplementary information recorded to the supplementary information recording region; and
automatically or selectively recording the read supplementary information to at least one of the front surface and back surface of a photographic print.

59. The print method according to claim 58, further comprising the step of reproducing the supplementary information recorded to the supplementary information recording region of the recording medium with the camera on which the recording medium is mounted.

60. The print method according to claim 58, wherein the recording medium is a film cartridge which can be mounted on and taken out of the camera, and comprises a case in which a photographic film as a photographing image recording region is accommodated and on which an IC memory as the supplementary information recording region is mounted, or the recording medium is a memory medium which can be mounted on and taken out of the camera, and has a photographed image data region and the supplementary information recording region as well as includes information for recognizing address of each region, which is added with at least one of the camera and a supplementary information recording means, or fixedly includes the information for recognizing the address of each region.

61. The print method according to claim 58, wherein the supplementary information is at least one of information as to a photographing location, information as to a photographing subject and amusement information.

62. The print method according to claim 58, wherein the supplementary information is recorded to the supplementary information recording region of the recording medium by a print shop before photographing is carried out.

63. The print method according to claim 58, wherein
the camera comprises reading means for reading the supplementary information out of the recording medium and recording means for recording the supplementary information to the recording medium, and
the supplementary information is read out of the supplementary information recording region by the reading means of the camera on which the recording medium is mounted and
at least one of the following occurs:
the read-out supplementary information is reproduced, and
the read-out supplementary information is recorded to the supplementary information recording region by the recording means.

64. A print system, comprising:
a recording medium having a photographing image recording region and the supplementary information recording region;
supplementary information recording means for recording supplementary information as recordable and readable data to the supplementary information recording region of the recording medium;
a camera on which the recording medium to which the supplementary information is recorded is mounted and records a photographed image of a subject to the photographing image recording region of the recording medium; and
a printer, when the image of the subject recorded to the photographing image recording region of the recording medium is printed, which reads the supplementary information recorded to the supplementary information recording region and records automatically or selectively the read supplementary information to at least one of a front surface and a back surface of a photographic print.

65. The print system according to claim 64, wherein the recording medium is a film cartridge which can be mounted on and taken out of the camera, and comprises a case in which a photographic film as a photographing image recording region is accommodated and on which an IC memory as the supplementary information recording region is mounted, or the recording medium is a recording medium which can be mounted on and taken out of the camera and has a photographed image data region as the photographing image recording region and a supplementary information region as the supplementary information recording region in memory regions as well as to which information for recognizing address of each region is added or fixedly provided.

66. The print system according to claim 64, wherein the supplementary information is at least one of information as to a photographing location, information as to a photographing subject and amusement information.

67. The print system according to claim 64, wherein the supplementary information is recorded to the supplementary information recording region of the recording medium by a print shop before photographing is carried out.

68. The print system according to claim 64, wherein the camera comprises reading means for reading the supplementary information out of the recording medium and recording the supplementary information recording to the recording medium, the supplementary information is read out of the supplementary information recording region by the reading means of the camera on which the recording medium is mounted and reproduced and/or is recorded to the supplementary information recording region by the recording means.

69. A print method, comprising the steps of:

receiving supplementary information with a camera on which a recording medium is mounted, wherein the recording medium has a photographed image data region and a supplementary information recording region and to which information for recognizing address of each region is added or fixedly provided;

recording the received supplementary information as recordable and readable data to the supplementary information recording region of the recording medium;

thereafter, photographing a subject with the camera to record an image of the subject to the photographed image data region of the recording medium; and when the image of the subject recorded to the photographed image data region of the recording medium is printed;

reading the supplementary information recorded to the supplementary information recording region; and automatically or selectively recording the read supplementary information to at least one of the front surface and back surface of a photographic print.

70. A print system, comprising:

a recording medium which has a photographed image data region and a supplementary information recording region and to which information for recognizing address of each region is added or fixedly provided;

a camera which receives supplementary information, has recording means for recording the received supplementary information as recordable and readable data to the supplementary information recording region of the recording medium which is mounted on the camera, and records a photographed image of a subject to the photographed image data region of the recording medium to which the supplementary information is recorded by the recording means; and a printer, when the image of the subject recorded to the photographed image data region of the recording medium is printed, which reads the supplementary information recorded to the supplementary information recording region and records automatically or selectively the read supplementary information to at least one of a front surface and a back surface of a photographic print.

71. A photographing support system, comprising the steps of:

using a recording medium having a photographing image recording region and an information recording region;

recording as photographing support information one or more photographing support conditions stored in a database outside of a camera on which the recording medium is mounted so that an image can be photographed in accordance with taste of each customer to the information recording region before the image is photographed to the photographing image recording region with the camera;

reading the photographing support information from the information recording region with an information reading means mounted on the camera in photographing; and executing at least one of the control of the photographing operation carried out by the camera and the reproduction of the photographing support information in accordance with the read photographing support information.

72. The photographing support system according to claim 71, wherein the recording medium is a film cartridge comprising a case in which a photographic film as a photographing image recording region is accommodated and on which an IC memory as an information recording region is mounted, or the recording medium is a memory medium which has a photographed image data region and an information recording region as well as includes information added thereto by the camera and/or an information recording means to recognize the address of each region or fixedly includes information for recognizing the address of each region.

73. The photographing support system according to claim 71, wherein the photographing support information is photographing information accumulated corresponding to each customer as well as information as to the photographing conditions of the camera which are set in accordance with at least one of photograph image correcting information and classified photographing scenes.

74. The photographing support system according to claim 71, further comprising the steps of:

recording the one or more photographing support conditions in the database for each customer as the information photographing support;

setting one or more new photographing support conditions by analyzing again the one or more photographing support conditions recorded in the database.

75. The photographing support system according to claim 71, further comprising the steps of:

classifying previously various kinds of photographing scenes;

setting the one or more photographing support conditions in accordance with each of the classified photographing scenes;

storing the set one or more photographing support conditions in the database;

thereafter, reading out the one or more photographing support conditions stored in the database from the database;

recording the read one or more photographing support conditions as the photographing support information to the information recording region of the recording medium;

controlling the photographing operation carried out by the camera in accordance with the corresponding photographing support information recorded to the information recording region of the recording medium when one scene of the classified photographing scenes is photographed.

76. A camera on which a recording medium which has a photographed image data region and a supplementary information recording region is mounted, comprising:
- receiving means for receiving supplementary information;
- first recording means for recording the received supplementary information as recordable and readable data to the supplementary information recording region of the recording medium which is mounted on the camera; and
- second recording means for recording a photographed image of a subject to the photographed image data region of the recording medium to which the supplementary information is recorded by the recording means.

77. The camera according to claim 76, wherein the recording medium is a recording medium to which information for recognizing address of each region of a photographed image data region as the photographing image recording region and a supplementary information region as the supplementary information recording region is added or fixedly provided.

78. A camera on which a recording medium which has a photographing image recording region and a supplementary information recording region is mounted and in which supplementary information is recorded to the supplementary information recording region, comprising:
- recording means for recording a photographed image of a subject to the photographing image recording region of the recording medium to which at least location information of a photographing place or a photographing subject as the supplementary information is recorded to the supplementary information recording region;
- Global Positioning System being built-in which detects that a specific point suitable to photographing of the photographing place or the photographing subject has been approached when the camera is approaching to the specific point; and
- reproducing means for reproducing automatically the supplementary information of the photographing place or the photographing subject.

79. A camera on which a recording medium which has a photographing image recording region and a supplementary information recording region is mounted and in which supplementary information is recorded to the supplementary information recording region, comprising:
- recording means for recording a photographed image of a subject to the photographing image recording region of the recording medium to which at least the subject as the supplementary information is recorded to the supplementary information recording region;
- an image sensor for reading the subject toward which the camera is directed; and
- reproducing means for recognizing the subject read by the image sensor and reproducing automatically the supplementary information of the subject read by the image sensor.

* * * * *